(12) United States Patent
Kogawa et al.

(10) Patent No.: US 7,212,793 B2
(45) Date of Patent: May 1, 2007

(54) RADIO RECEPTION APPARATUS AND RADIO RECEPTION METHOD

(75) Inventors: Tsuyoshi Kogawa, Kanagawa (JP); Hideo Kasami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 194 days.

(21) Appl. No.: 10/901,202

(22) Filed: Jul. 29, 2004

(65) Prior Publication Data

US 2005/0064832 A1    Mar. 24, 2005

(30) Foreign Application Priority Data

Jul. 29, 2003   (JP) .............................. 2003-202859
Jul. 28, 2004   (JP) .............................. 2004-220699

(51) Int. Cl.
*H04Q 7/20* (2006.01)

(52) U.S. Cl. ...................... 455/132; 455/133; 455/135; 455/191.1

(58) Field of Classification Search ................ 455/132, 455/133, 134, 135, 130, 277.1, 277.2, 500, 455/269, 179.1, 183.1, 73, 550.1, 562.1; 370/441, 310, 342, 328, 329, 473; 375/267, 375/147, 148
See application file for complete search history.

(56) References Cited

U.S. PATENT DOCUMENTS 5,694,395 A * 12/1997 Myer et al. .................. 370/480
5,970,061 A * 10/1999 Kokudo ...................... 370/344
6,104,930 A * 8/2000 Ward et al. .................. 455/450
6,115,426 A * 9/2000 Fujimoto et al. ............ 375/260
6,622,013 B1 * 9/2003 Miyoshi et al. .......... 455/277.2
6,628,638 B1 * 9/2003 Sato et al. ................... 370/343
6,687,492 B1 * 2/2004 Sugar et al. .............. 455/276.1
2002/0018483 A1 * 2/2002 Kuwabara et al. .......... 370/430
2002/0159470 A1 * 10/2002 Atarashi et al. ............ 370/441
2003/0137955 A1 * 7/2003 Kim et al. ................... 370/332
2003/0185179 A1 * 10/2003 Inogai et al. ................ 370/335
2004/0008614 A1 * 1/2004 Matsuoka et al. .......... 370/203
2004/0233838 A1 * 11/2004 Sudo et al. .................. 370/208

FOREIGN PATENT DOCUMENTS

| JP | 2000-174726 | 6/2000 |
| JP | 2001-268050 | 9/2001 |
| JP | 2002-261727 | 9/2002 |

* cited by examiner

*Primary Examiner*—Jean Gelin
(74) *Attorney, Agent, or Firm*—Oblon, Spivak, McClelland, Maier & Neustadt, P.C.

(57) ABSTRACT

A radio reception apparatus is a radio reception apparatus for demodulating a multicarrier signal modulated according to multicarrier modulation. It includes a plurality of antenna sections, each for receiving a multicarrier signal, a plurality of carrier selection sections, each of the carrier selection sections selecting at least one subcarrier signal for each of the antenna sections out of the multicarrier signal received by each of the antenna sections, an antenna selection section for selecting a reception antenna section from among the antenna sections based on the signal strengths of the subcarrier signals selected by the carrier selection sections, and a demodulation section for demodulating the multicarrier signal received by the antenna section selected by the antenna selection section.

15 Claims, 27 Drawing Sheets

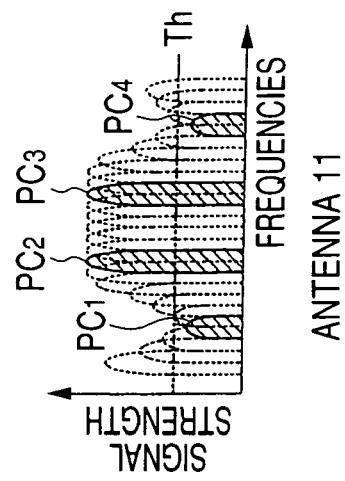
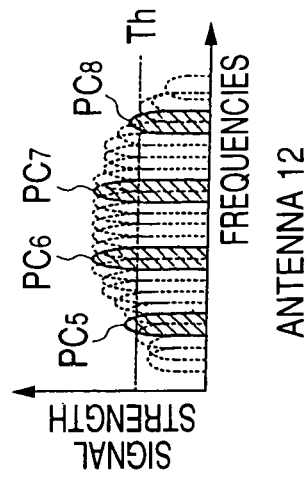
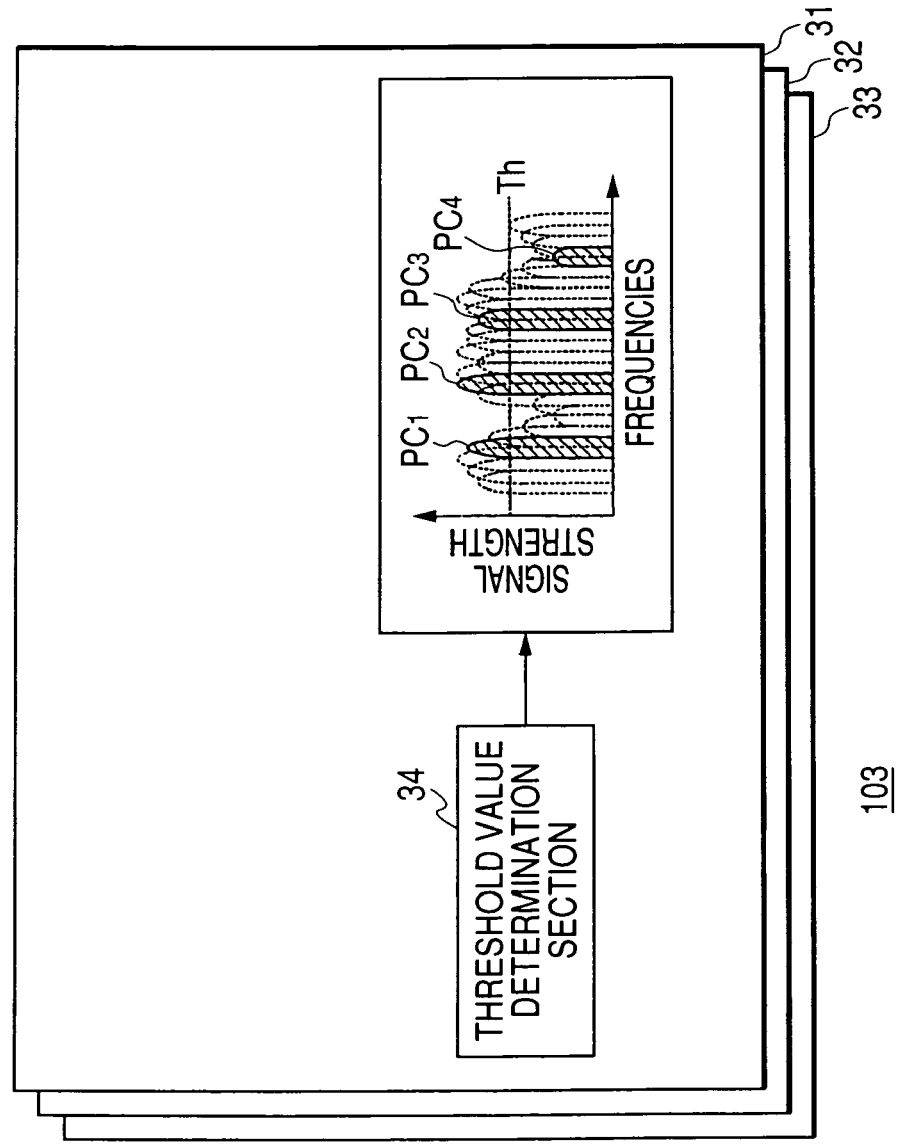

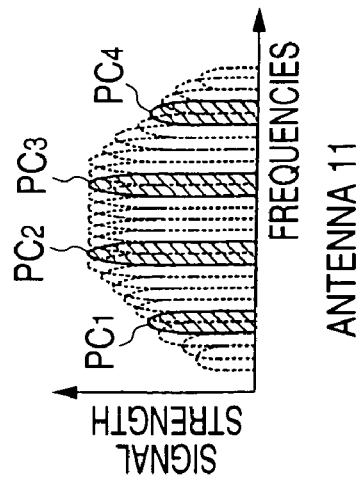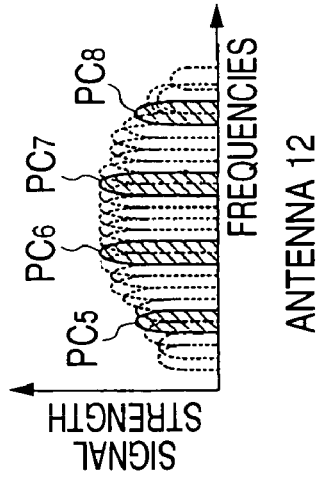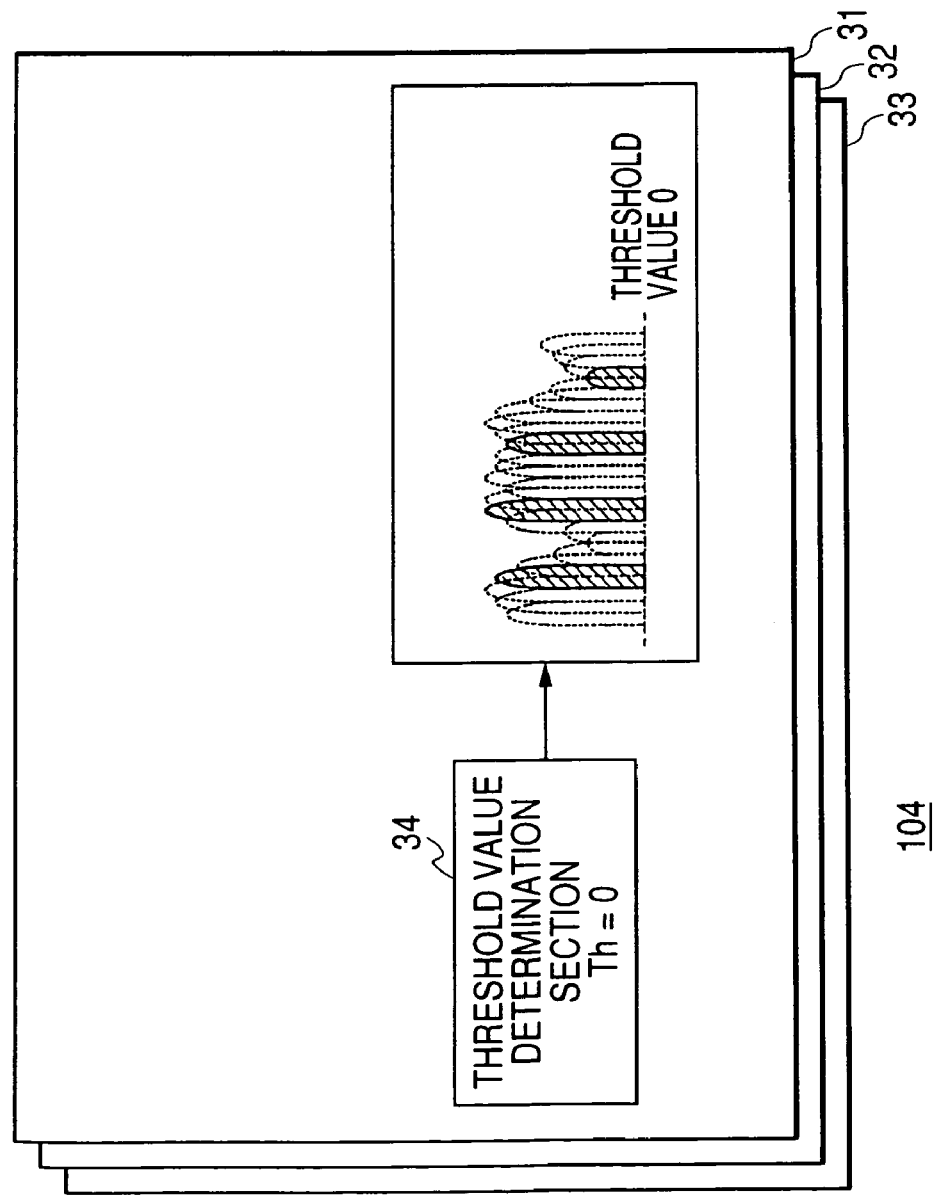

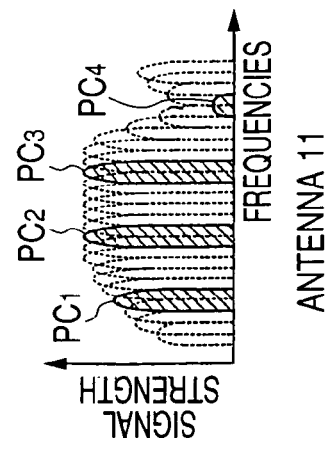
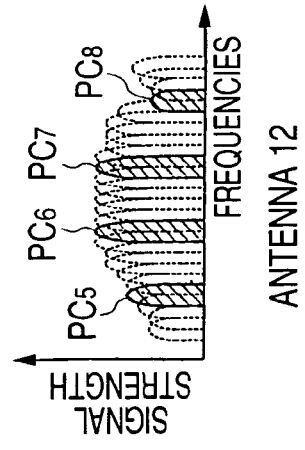
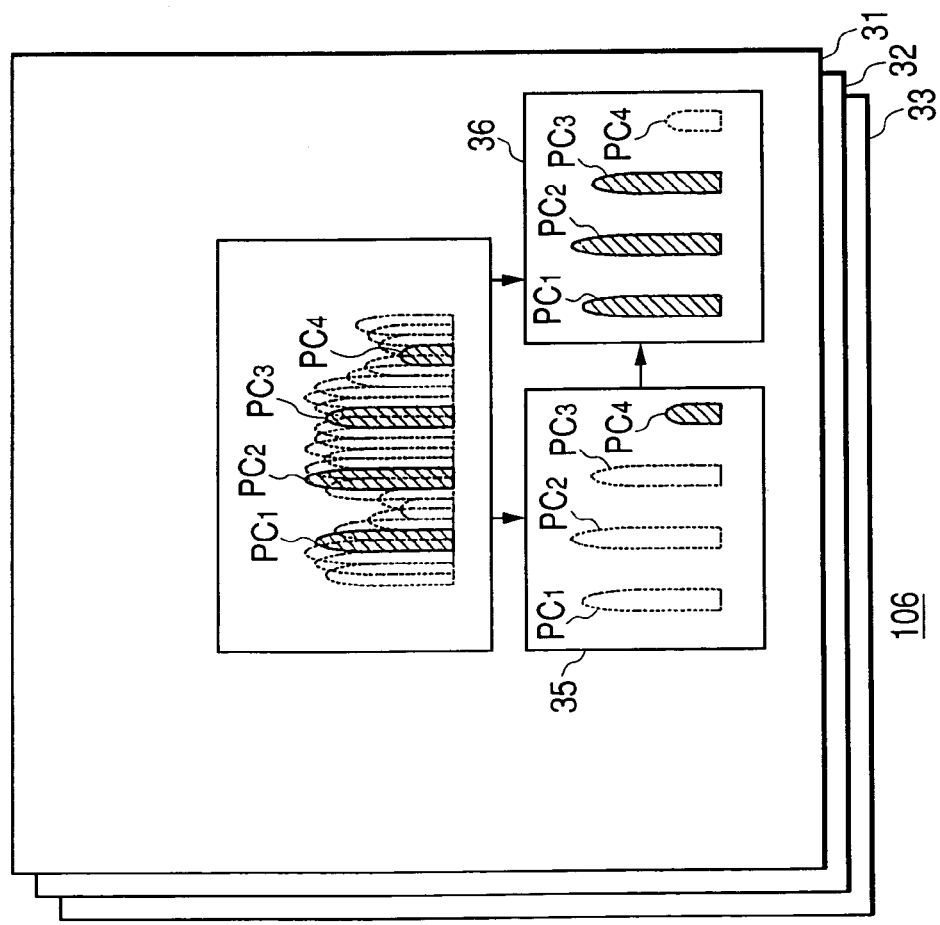

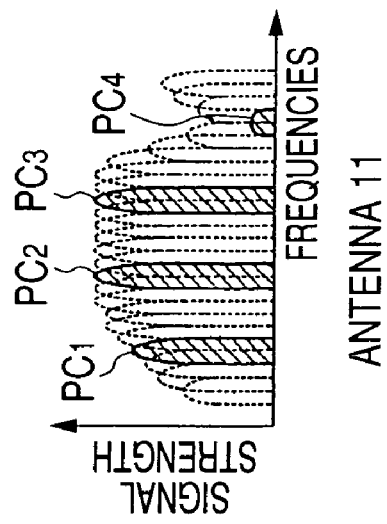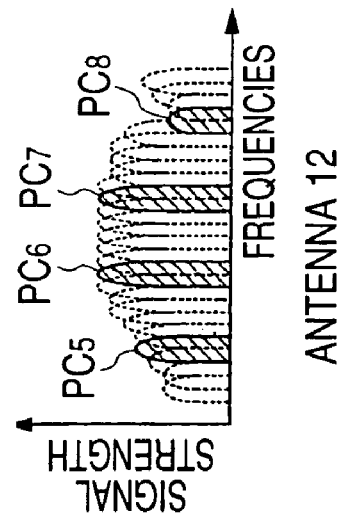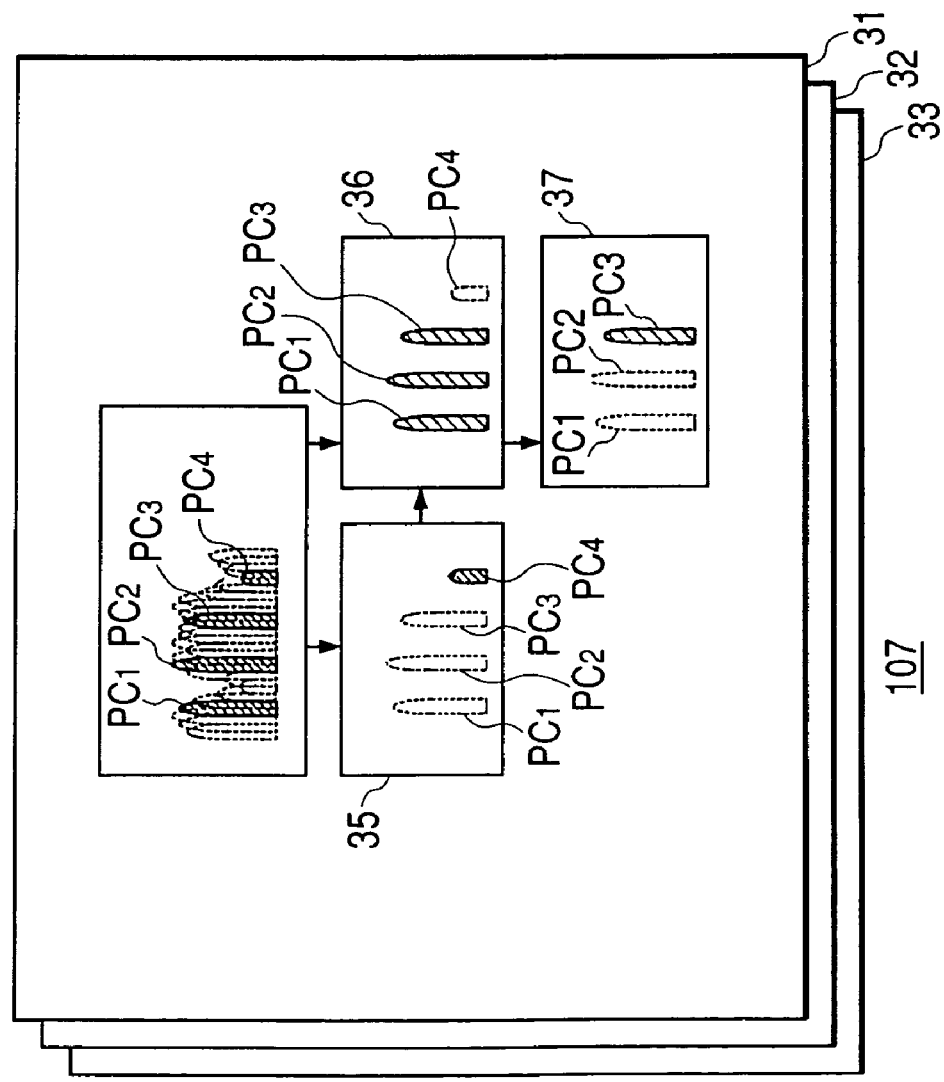

RADIO RECEPTION APPARATUS AND RADIO RECEPTION METHOD

CROSS-REFERENCE TO RELATED APPLICATIONS

This application is based upon and claims the benefit of priorities from both the prior Japanese Application NO. 2003-202859, filed on Jul. 29, 2003 and the prior Japanese Application No. 2004-220699, filed on Jul. 28, 2004; the entire contents of which are incorporated herein by reference.

BACKGROUND OF THE INVENTION

1. Field of the Invention

This invention relates to a radio reception apparatus and in particular to a radio reception apparatus for a multicarrier signal.

2. Description of the Related Art

Diversity reception has been used as a method for coping with degradation of the communication quality caused by fading in radio communications. A diversity reception apparatus in a related art receives a multicarrier signal by a plurality of reception means through a plurality of antennas. The diversity reception apparatus finds received power for each of the multicarrier signals received by the plurality of reception means, and selects one antenna based on the received power. Further, the diversity reception apparatus demodulates the multicarrier signal received through the selected antenna. (Please see JP-A-2000-174726(Kokai), JP-A-2001-268050(Kokai), and JP-A-2002-261727(Kokai)).

The diversity reception apparatus in the related art selects an antenna based on the signal strength of the whole multicarrier signal. However, when an antenna is selected based on the received power of the whole multicarrier signal, if a subcarrier signal of a part of multicarrier signal has large distortion, the diversity reception apparatus cannot select an antenna with good communication quality.

SUMMARY OF THE INVENTION

It is an object of the invention to provide a radio reception apparatus that can select an antenna with good communication quality from among antennas if a multicarrier signal has distortion.

According to one aspect of the invention, there is provided a radio reception apparatus including: a plurality of antenna sections, each of the antenna sections receiving a multicarrier signal which is modulated according to multicarrier modulation and demodulating the modulated multicarrier signal; a plurality of carrier selection sections each of the carrier selection sections selecting at least one subcarrier signal for each of the plurality of antenna sections out of the multicarrier signal received by each of the plurality of antenna sections; an antenna selection section for selecting a reception antenna section from among the plurality of antenna sections based on signal strengths of the subcarrier signals selected by the plurality of carrier selection sections; and a demodulation section for demodulating the multicarrier signal received by the antenna section selected by the antenna selection section.

According to another aspect of the invention, there is provided a radio reception method using a radio reception apparatus, including: receiving a multicarrier signal modulated according to multicarrier modulation through a plurality of antenna sections; selecting at least one subcarrier signal for each of the antenna sections out of the multicarrier signal received by each of the antenna sections based on frequency; selecting a reception antenna section from among the antenna sections based on the signal strengths of the selected subcarrier; and demodulating the multicarrier signal received by the selected reception antenna section.

BRIEF DESCRIPTION OF THE DRAWINGS

These and other objects and advantages of the invention will become more fully apparent from the following detailed description taken with the accompanying drawings in which:

FIGS. 5A, 5B, and 5C are schematic drawings showing carrier selection sections of a reception apparatus according a fourth embodiment of the invention;

FIGS. 6A, 6B, and 6C are schematic drawings showing carrier selection sections of a reception apparatus according a fifth embodiment of the invention;

FIGS. 8A, 8B, and 8C are schematic drawings showing carrier selection sections of a reception apparatus according a seventh embodiment of the invention;

FIGS. 9A, 9B, and 9C are schematic drawings showing carrier selection sections of a reception apparatus according an eighth embodiment of the invention;

FIG. 22 represents a frequency characteristic of a data part of a packet which was complied with IEEE802.11a;

FIG. 23 represents a frequency characteristic of a short preamble, which is a part of a preamble part of the packet which was complied with IEEE802.11a;

DETAILED DESCRIPTION OF THE INVENTION

Referring now to the accompanying drawings, there are shown embodiments of the invention. It is to be understood that the invention is not limited to the embodiments thereof.

A diversity radio reception apparatus according to each embodiment of the invention selects a subcarrier signal from multicarrier signals received through a plurality of antennas. The radio reception apparatus selects an antenna based on the signal strength of the subcarrier signal, and receives signals through the selected antenna. Accordingly, the radio reception apparatus can select the antenna with good communication quality. The diversity radio reception apparatus can be used as a selection diversity reception apparatus in OFDM (Orthogonal Frequency Division Multiplexing) modulation of a radio LAN, etc.

(First Embodiment)

Figure 1:
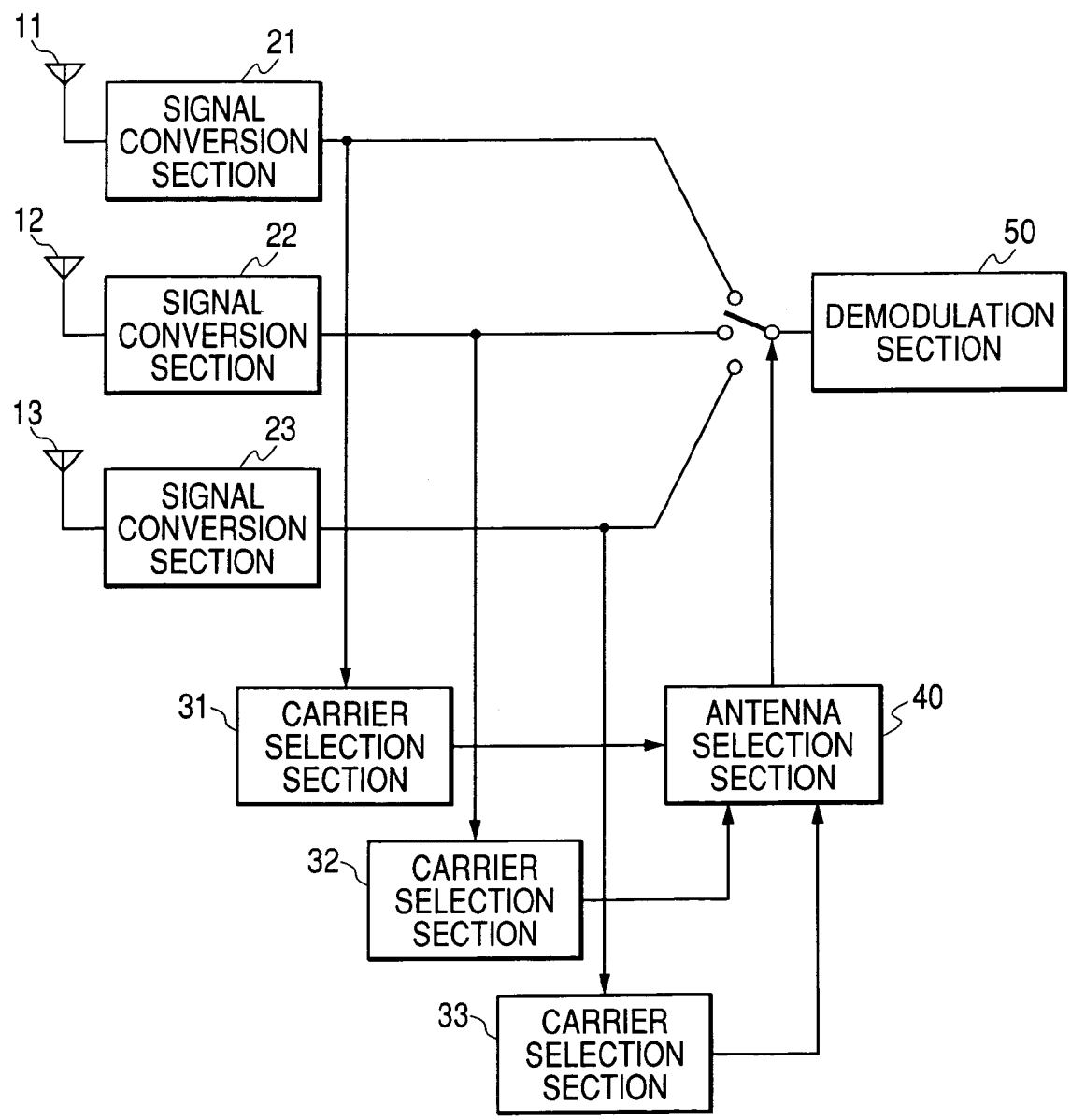
FIG. 1 is a block diagram of a diversity radio reception apparatus 100 according to a first embodiment of the invention.

FIG. 1 is a block diagram of a diversity radio reception apparatus (simply, reception apparatus) 100 according to a first embodiment of the invention. The reception apparatus 100 includes antennas 11 to 13, signal conversion sections 21 to 23, carrier selection sections 31 to 33, an antenna selection section 40, and a demodulation section 50. Each of the antennas 11 to 13 receives the multicarrier signal modulated according to multicarrier modulation by the communicating party with the reception apparatus 100. In the embodiment, the three antenna sections are provided, but two or four or more antenna sections may be provided.

Each of the signal conversion sections 21 to 23 includes an LNA (Low Noise Amplifier) for amplifying the multicarrier signal, a D/C (Down Converter) section for converting the frequency of the multicarrier signal into a base band, an A/D conversion section for converting an analog signal into a digital signal, and an FFT (Fast Fourier Transform) section for executing discrete Fourier transform for each of the multicarrier signals. The multicarrier signal passed through the signal conversion section 21 to 23 is made up of a plurality of subcarrier signals different in frequency band.

The carrier selection sections 31 to 33 are connected to the signal conversion sections 21 to 23 respectively for selecting a specific subcarrier signal out of the multicarrier signal passed through the signal conversion section 21 to 23 based on the frequency.

As many signal conversion sections as and as many carrier selection sections as the number of antenna sections are provided. In the embodiment, three signal conversion sections 21 to 23 and three carrier selection sections 31 to 33 are provided because the number of antenna sections is three (11 to 13).

The antenna selection section 40 is connected to the carrier selection sections 31 to 33 and obtains the subcarrier signals selected by the carrier selection sections 31 to 33. The antenna selection section 40 selects the reception antenna section based on the signal strength of each of the subcarrier signals.

The demodulation section 50 demodulates the multicarrier signal received through the antenna section selected by the antenna selection section 40.

Figure 2:
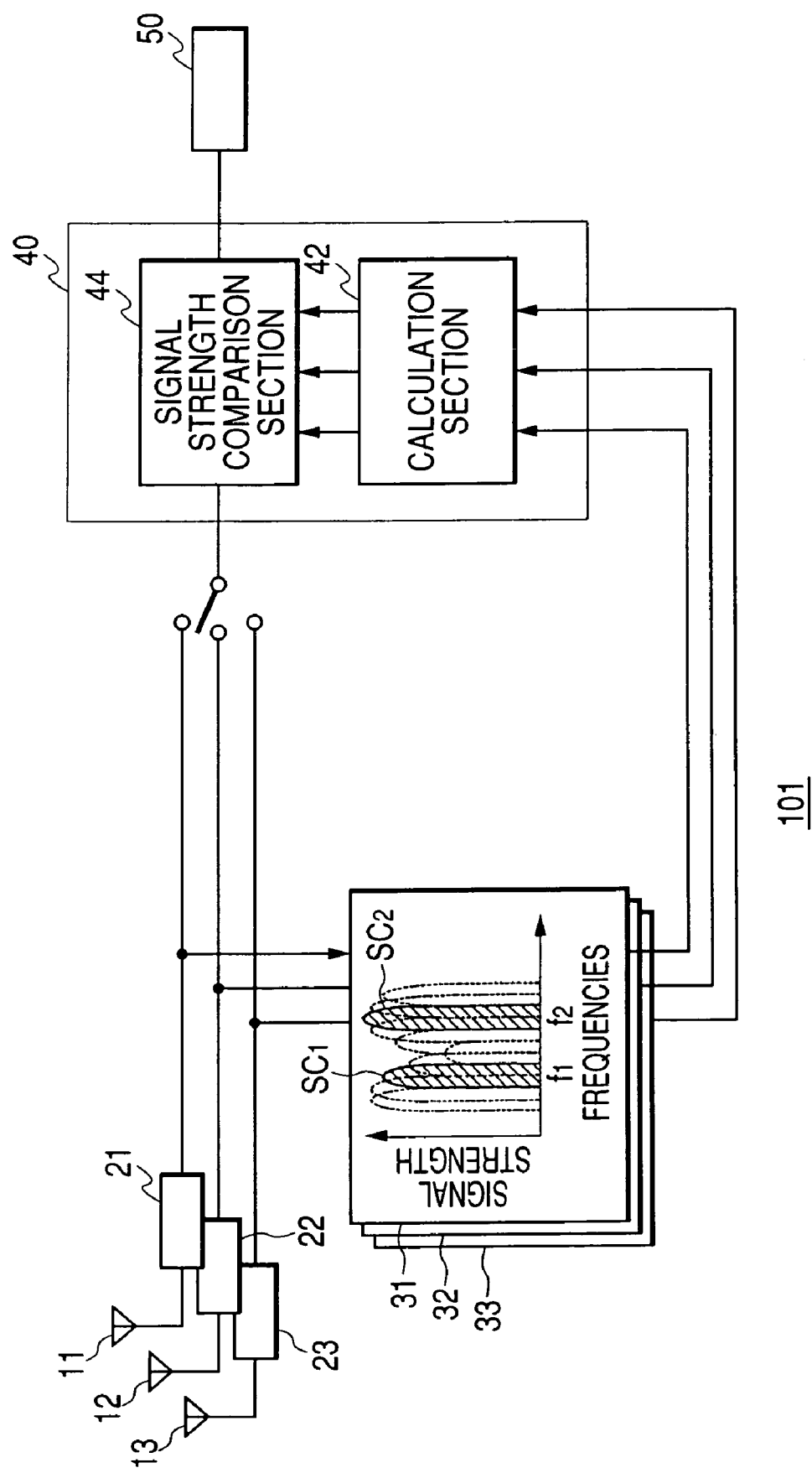
FIG. 2 is a schematic drawing to specifically show the operation of the carrier selection sections 31 to 33 and the antenna selection section 40 in the embodiment.

FIG. 2 is a schematic drawing to specifically show the operation of the carrier selection sections 31 to 33 and the antenna selection section 40 in the embodiment. The carrier selection sections 31 to 33 and the antenna selection section 40 will be discussed in more detail with reference to FIG. 2.

The graph shown in the carrier selection section 31 in FIG. 2 is a graph to show the frequencies and the signal strength of the multicarrier signal received through the antenna section 11. The multicarrier signal is made up of a plurality of subcarrier signals different in frequency band. Each subcarrier signal is indicated by the dashed line in the graph. The carrier selection section 31 selects subcarrier signals $SC_1$ and $SC_2$ corresponding to predetermined frequencies $f_1$ and $f_2$ from among the subcarrier signals. Likewise, the carrier selection section 32 (33) selects the subcarrier signals corresponding to the frequencies $f_1$ and $f_2$ from among the subcarrier signals making up the multicarrier signal received through the antenna section 12 (13). The subcarrier signals selected by the carrier selection sections 31 to 33 are transmitted to the antenna selection section 40.

The antenna selection section 40 has a calculation section 42 and a signal strength comparison section 44. The calculation section 42 calculates average signal strength $AV_1$ of the subcarrier signals $SC_1$ and $SC_2$ selected by the carrier selection section 31, average signal strength $AV_2$ of the subcarrier signals selected by the carrier selection section 32, and average signal strength $AV_3$ of the subcarrier signals selected by the carrier selection section 33.

The signal strength comparison section 44 compares the average signal strengths $AV_1$, $AV_2$, and $AV_3$ and selects the antenna section corresponding to the maximum average signal strength from among the antenna sections 11 to 13.

In the embodiment, each of the carrier selection sections 31 to 33 selects two subcarrier signals, but may select one or three or more subcarrier signals.

Figure 3:
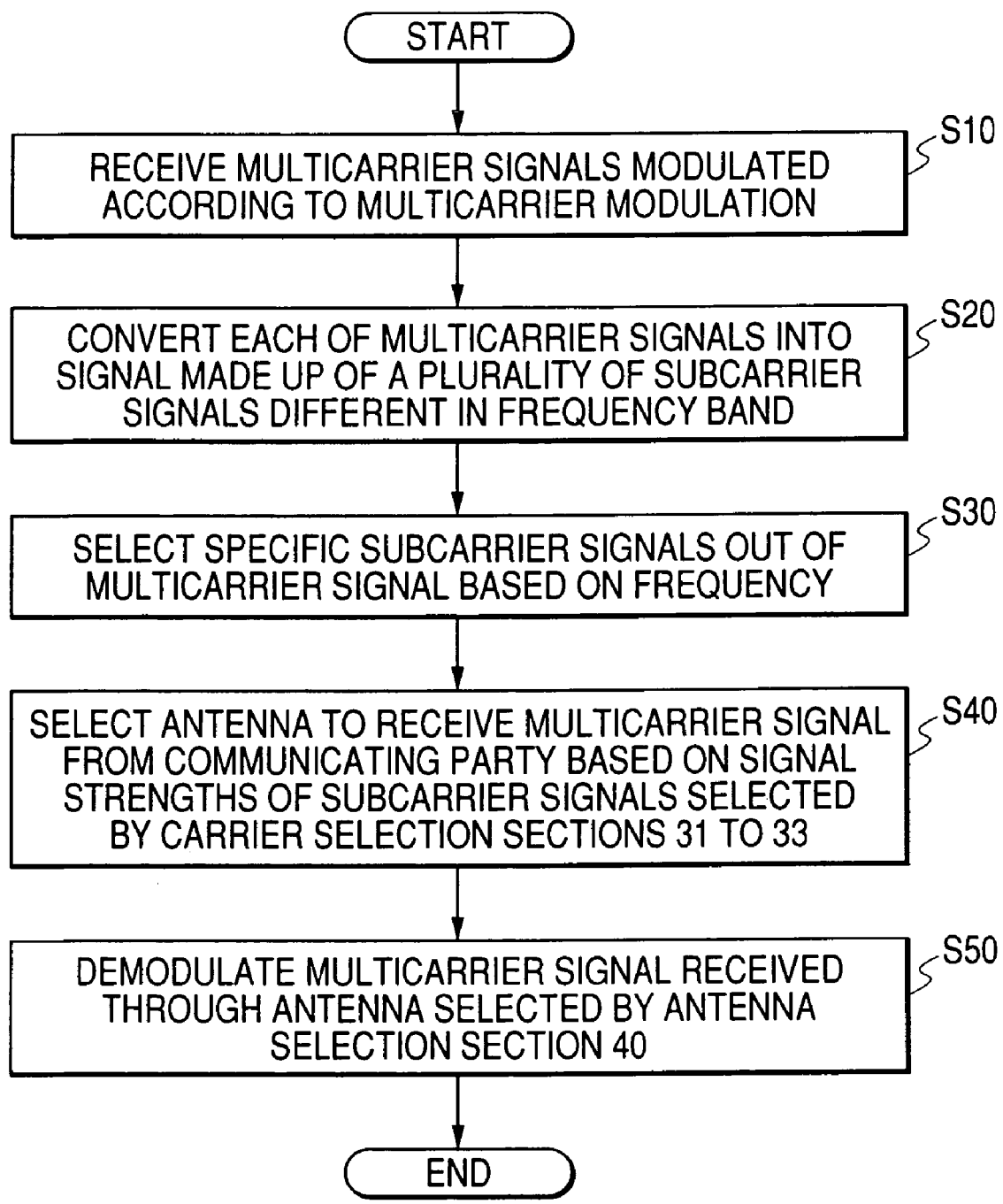
FIG. 3 is a flowchart to show the operation of the reception apparatus 100.

FIG. 3 is a flowchart to show the operation of the reception apparatus 100. To begin with, the antenna sections 11 to 13 receive the multicarrier signal modulated according to multicarrier modulation (S10). Next, the signal conversion sections 21 to 23 convert the multicarrier signals received from the antenna sections 11 to 13. Accordingly, the multicarrier signal is converted into a signal made up of a plurality of subcarrier signals different in frequency band (S20).

Each of the carrier selection sections 31 to 33 selects specific subcarrier signals out of the multicarrier signal based on the frequency (S30).

The antenna selection section 40 selects the antenna section used to receive the multicarrier signal based on the signal strengths of the subcarrier signals selected by the carrier selection sections 31 to 33 (S40).

The demodulation section 50 demodulates the multicarrier signal received through the antenna section selected by the antenna selection section 40 (S50).

According to the embodiment, the antenna section can be selected based on the signal strengths of specific subcarrier signals on specific frequency band. Accordingly, the reception apparatus 100 can select the subcarrier signals having a large effect on demodulation, for example, and can conduct communications using the antenna corresponding to the subcarrier signals having the maximum average signal strength.

Generally, when large distortion is contained in the multicarrier signal, the antenna with large received power of the whole multicarrier signal is not necessarily the antenna with good communication quality. According to the embodiment, the average signal strength of the subcarrier signals having a large effect on demodulation in the multicarrier signal can be calculated, so that the reception apparatus 100 can reliably select the antenna section with good communication quality from among the antenna sections 11 to 13.

(Second Embodiment)

A reception apparatus 101 according to a second embodiment of the invention will be discussed with reference to FIGS. 1 and 2. In the first embodiment, the calculation section 42 calculates the average signal strengths $AV_1$, $AV_2$, and $AV_3$ of the selected subcarrier signals, and the signal strength comparison section 44 compares the average signal strengths $AV_1$, $AV_2$, and $AV_3$, thereby selecting the antenna section for communications. The reception apparatus of the second embodiment differs from the reception apparatus of the first embodiment in that a calculation section 42 selects subcarrier signals $MX_1$ to $MX_3$ (not shown) having the largest signal strength for carrier selection sections 31 to 33, that a signal strength comparison section 44 compares the subcarrier signals $MX_1$ to $MX_3$ and selects the subcarrier signal having the largest signal strength from among the subcarrier signals, and that an antenna selection section 40 selects the antenna section receiving the subcarrier signal having the largest signal strength.

In the second embodiment, the subcarrier signal having the maximum signal strength can be selected from among the subcarrier signals except the subcarrier signals in the frequency band having distortion in multicarrier signal. Accordingly, the reception apparatus 101 can reliably select the antenna with good communication quality.

(Third Embodiment)

Figure 4:
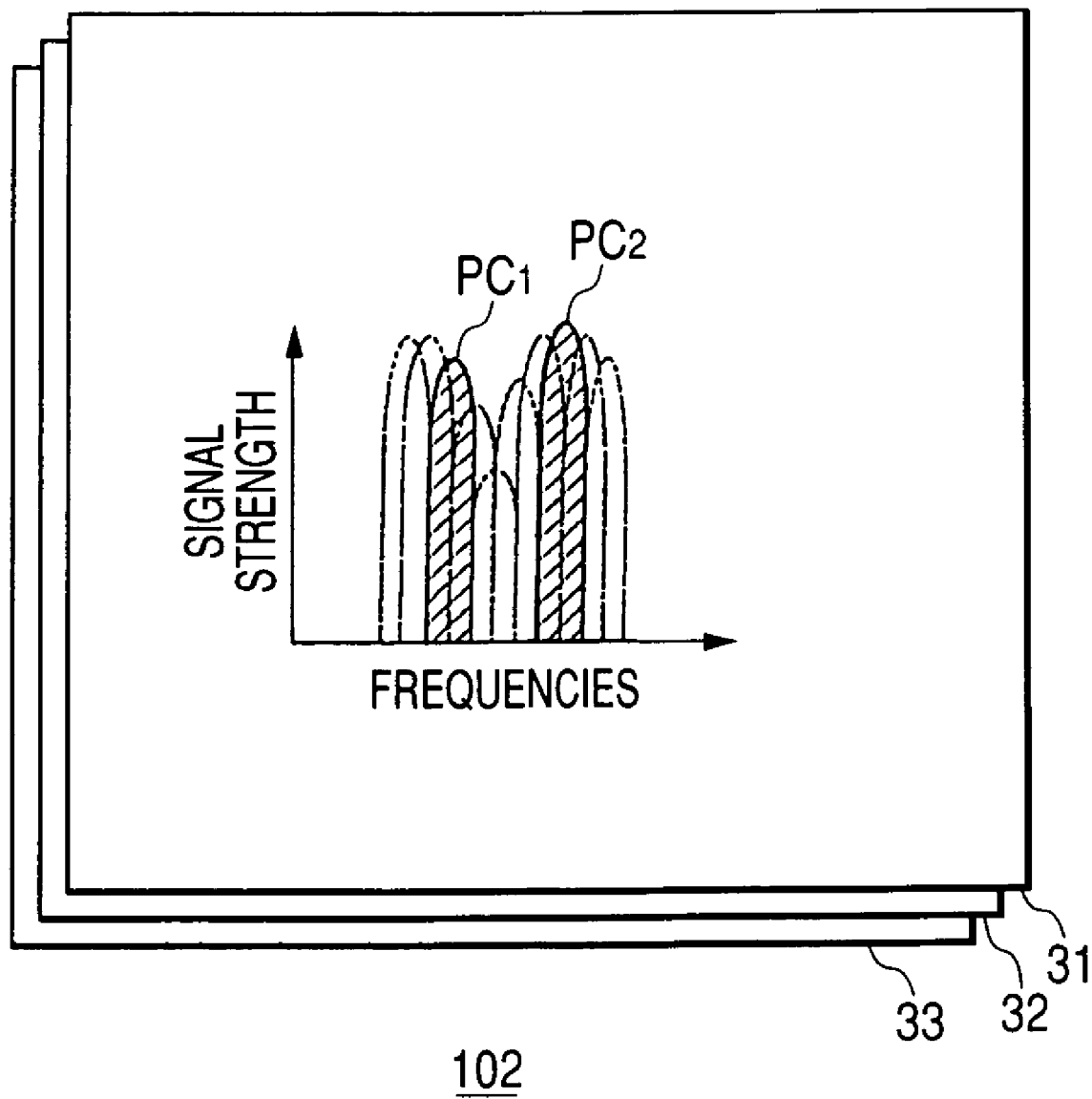
FIG. 4 is a schematic drawing to show carrier selection sections 31 to 33 of a reception apparatus 102 according to a third embodiment of the invention.

FIG. 4 is a schematic drawing to show carrier selection sections 31 to 33 of a reception apparatus 102 according to a third embodiment of the invention. The carrier selection section 31 in the embodiment selects pilot carrier signals $PC_1$ and $PC_2$ out of multicarrier signals received by an antenna section 11. The carrier selection sections 32 and 33 select pilot carrier signals out of multicarrier signals received by antenna sections 12 and 13. Other components and the operation of the reception apparatus 102 are similar to those in the first or second embodiment replacing the subcarrier signals with the pilot carrier signals.

Generally, if the pilot carrier signal is a subcarrier signal used as the reference for correcting distortion. If the signal length of the pilot carrier signal is small, the whole multicarrier signal cannot accurately be corrected.

Therefore, the antenna section receiving the pilot carrier signal having the maximum signal strength or the largest average signal strength is selected from among the antenna sections 11 to 13, whereby the reception apparatus 102 can accurately correct the whole multicarrier signal received through the selected antenna section. Consequently, the reception apparatus 102 can conduct good-quality communications. Further, the reception apparatus of the third embodiment has similar advantages to those of the reception apparatus of the first and second embodiments.

In the third embodiment, the number of pilot carrier signals is two, but may be one or three or more.

(Fourth Embodiment)

FIG. 5A is a schematic drawing to show carrier selection sections 31 to 33 of a reception apparatus 103 according to a fourth embodiment of the invention. Each of the carrier selection sections 31 to 33 in the embodiment has a threshold value determination section 34 for determining a threshold value Th concerning the signal strength of a pilot carrier signal. The threshold value determination sections 34 of the carrier selection sections 31 to 33 determine the same threshold value Th. The carrier selection section 31 selects pilot carrier signals $PC_1$ to $PC_3$ exceeding the threshold value Th out of multicarrier signal received by an antenna section 11. The carrier selection sections 32 and 33 select pilot carrier signals exceeding the threshold value Th out of multicarrier signals received by antenna sections 12 and 13. Other components of the reception apparatus 103 are similar to those previously described with reference to FIG. 1.

Thus, in the embodiment, the pilot carrier signals each including larger signal strength than the threshold value Th are selected from among the pilot carrier signals in the multicarrier signal. In the embodiment, only the pilot carrier signals exceeding the threshold value Th are selected and thus the carrier selection sections 31 to 33 may differ in the number of selected pilot carrier signals.

The reception apparatus of the embodiment has similar advantages to those of the reception apparatus of the third embodiment. According to the fourth embodiment, the carrier selection sections 31 to 33 exclude signals including the signal strength lower than the threshold value Th, such as a pilot carrier signal $PC_4$. An antenna selection section 40 can select an antenna section using the pilot carrier signal including the large signal strength with small distortion among the pilot carrier signals. Consequently, the reception apparatus 103 can select the antenna with good communication quality. Particularly, it is effective when a demodulation section uses only pilot carrier signals including large signal strength for distortion correction.

For example, FIGS. 5B and 5C provide graphs of multicarrier signals received by the antenna sections 11 and 12. The carrier selection section 31 selects pilot carrier signals $PC_2$ and $PC_3$ out of multicarrier signal from the antenna section 11. The carrier selection section 32 selects pilot carrier signals $PC_5$ to $PC_8$ out of multicarrier signal from the antenna section 12. The average signal strength of the pilot carrier signals $PC_2$ and $PC_3$ is clearly larger than that of the pilot carrier signals $PC_5$ to $PC_8$. Therefore, according to the embodiment, the antenna selection section 40 reliably selects the antenna section 11.

On the other hand, if the threshold value is not set, the carrier selection section 31 selects not only the pilot carrier signals $PC_2$ and $PC_3$, but also pilot carrier signals $PC_1$ and $PC_4$. In this case, the average signal strength of the pilot carrier signals $PC_1$ to $PC_4$ becomes smaller than that of the pilot carrier signals $PC_2$ and $PC_3$. Therefore, the difference between the average signal strength of the pilot carrier signals $PC_1$ to $PC_4$ and that of the pilot carrier signals $PC_5$ to $PC_8$ becomes smaller than that when the threshold value is set. Therefore, for the antenna selection section 40 to reliably select the antenna section 11, preferably the threshold value of signal strength is provided in the carrier selection section 31.

The embodiment is effective when good pilot carrier signals including large signal strength and pilot carrier signals including extremely small signal strength are mixed in the multicarrier signal. Particularly, it produces effect when the demodulation section uses only pilot carrier signals including large signal strength for distortion correction.

(Fifth Embodiment)

FIG. 6A is a schematic drawing to show carrier selection sections 31 to 33 of a reception apparatus 104 according to a fifth embodiment of the invention. As shown in FIG. 6A, if it is obvious that the signal strength of multicarrier signal is large or small as a whole, threshold value determination sections 34 set threshold value Th to zero. Accordingly, the carrier selection sections 31 to 33 select all pilot carrier signals in the multicarrier signal. An antenna selection section 40 can select an antenna based on the average signal strengths of all pilot carrier signals. For example, FIGS. 9B and 9C provide graphs of multicarrier signals received by antenna sections 11 and 12. As shown in FIGS. 6B and 6C, the antenna selection section 40 calculates the average signal strength of pilot carrier signals $PC_1$ to $PC_4$ and that of pilot carrier signals $PC_5$ to $PC_8$. The antenna selection section 40 selects an antenna section 11 including large signal strength on the whole based on the calculation result.

The reception apparatus of the embodiment has similar advantages to those of the reception apparatus of the first embodiment. Particularly, the embodiment is effective when the distortion difference between the pilot carrier signals in the multicarrier signal is comparatively small. That is, the embodiment is effective when the signal strengths of the pilot carrier signals are large or small on the whole.

(Sixth Embodiment)

Figure 7B:
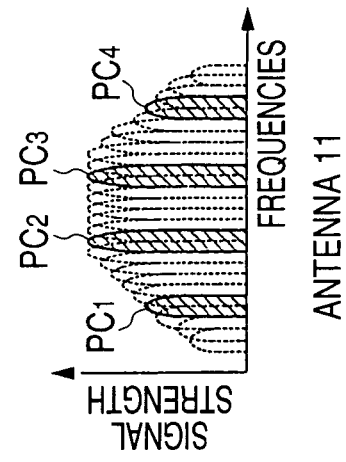
FIGS. 7A, 7B, and 7C are schematic drawings showing carrier selection sections of a reception apparatus according a sixth embodiment of the invention.
Figure 7C:
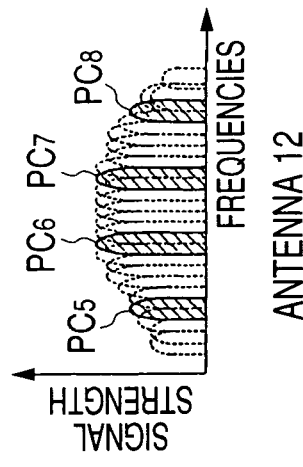
Figure 7A:
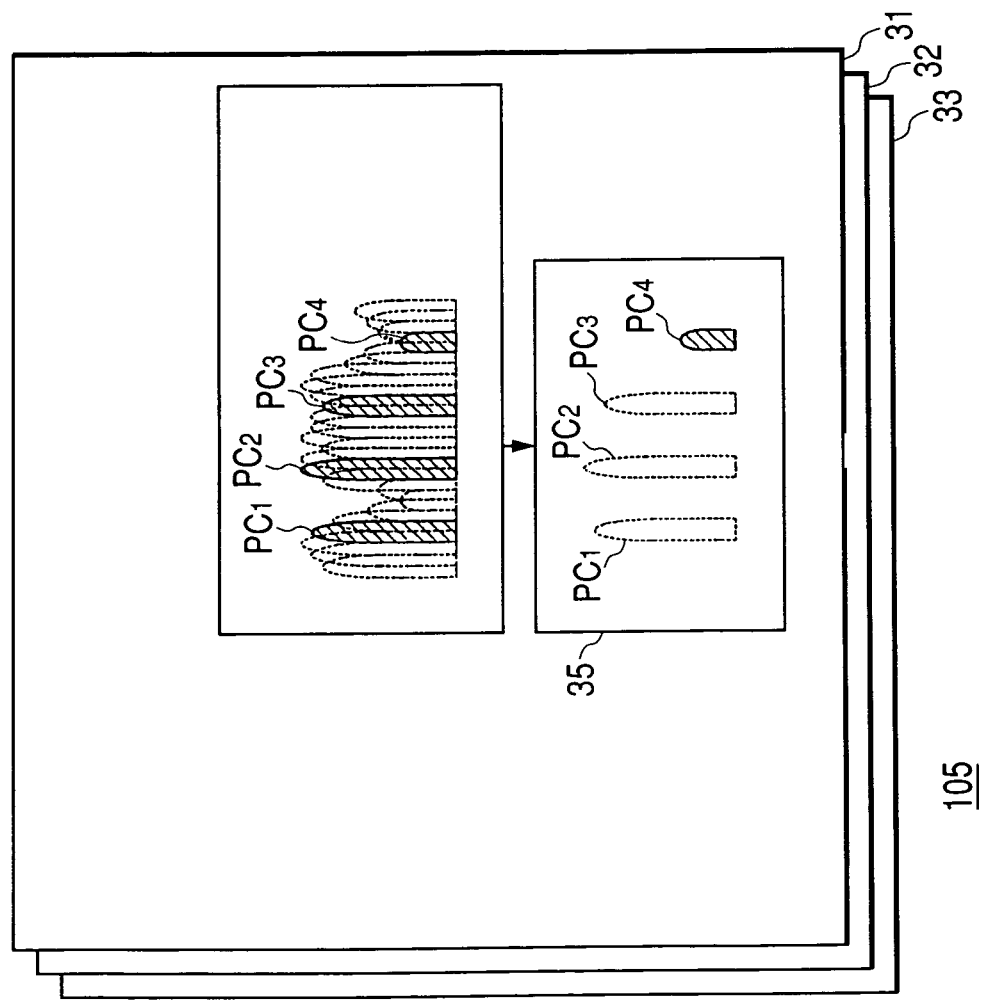

FIGS. 7A to 7C are schematic drawings to show carrier selection sections 31 to 33 of a reception apparatus 105 according to a sixth embodiment of the invention. Each of the carrier selection sections 31 to 33 in the embodiment has a minimum value detection section 35. Other components of the reception apparatus 105 are similar to those previously described with reference to FIG. 1.

The minimum value detection section 35 detects the pilot carrier signal including the minimum signal strength among pilot carrier signals. For example, in the carrier selection section 31, the minimum value detection section 35 detects pilot carrier signal $PC_4$. The carrier selection section 31 selects the pilot carrier signal $PC_4$. Thus, in the embodiment, the pilot carrier signal including the minimum signal strength is selected from among the pilot carrier signals in multicarrier signal. The carrier selection sections 32 and 33 also select the pilot carrier signal including the minimum signal strength from among the pilot carrier signals in multicarrier signal.

An antenna selection section 40 compares the pilot carrier signals selected by the carrier selection sections 31 to 33 and selects the antenna section including the maximum signal strength. Accordingly, in the embodiment, the antenna section including large signal strength can be selected.

The reception apparatus of the embodiment has similar advantages to those of the reception apparatus of the first embodiment. Particularly, the embodiment is effective when the distortion difference between the pilot carrier signals in the multicarrier signal is comparatively small. That is, the embodiment is effective when the signal strengths of the pilot carrier signals are large or small on the whole.

For example, FIGS. 7B and 7C provide graphs of multicarrier signals received by antenna sections 11 and 12. Assume that the pilot carrier signal including the minimum signal strength in the multicarrier signal shown in FIG. 7B is $PC_4$. Assume that the pilot carrier signal including the minimum signal strength in the multicarrier signal shown in FIG. 7C is $PC_5$. The antenna selection section 40 compares the pilot carrier signals $PC_4$ and $PC_5$. Further, the antenna selection section 40 selects the antenna section 11 receiving the pilot carrier signals $PC_4$ including comparatively large signal strength.

(Seventh Embodiment)

FIGS. 8A to 8C are schematic drawings to show carrier selection sections 31 to 33 of a reception apparatus 106 according to a seventh embodiment of the invention. Each of the carrier selection sections 31 to 33 in the embodiment has a minimum value detection section 35 and a minimum pilot carrier signal removal section 36 (simply, removal section 36). Other components of the reception apparatus 106 are similar to those previously described with reference to FIG. 1.

The minimum value detection section 35 detects the pilot carrier signal including the minimum signal strength among pilot carrier signals. For example, in the carrier selection section 31, the minimum value detection section 35 detects pilot carrier signal $PC_4$. The removal section 36 selects pilot carrier signals $PC_1$ to $PC_3$ other than the pilot carrier signal $PC_4$. Thus, in the embodiment, signals other than the pilot carrier signal including the minimum signal strength are selected from among the pilot carrier signals in multicarrier signal. The carrier selection sections 32 and 33 also select signals other than the pilot carrier signal including the minimum signal strength from among the pilot carrier signals in multicarrier signal.

In an antenna selection section 40, a calculation section 42 calculates average signal strengths $AV_1$, $AV_2$, and $AV_3$ of the pilot carrier signals selected by the carrier selection sections 31 to 33. A signal strength comparison section 44 compares the average signal strengths $AV_1$, $AV_2$, and $AV_3$ and selects the antenna section including the maximum average signal strength.

The reception apparatus of the embodiment has similar advantages to those of the reception apparatus of the first embodiment. Further, according to the embodiment, pilot carrier signals other than the pilot carrier signal including the minimum signal strength are selected, so that the reception apparatus 106 can reliably select the antenna with good communication quality. Particularly, it is effective when a demodulation section uses only pilot carrier signals including large signal strength for distortion correction.

The embodiment is effective when good pilot carrier signals including large signal strength and pilot carrier signals including extremely small signal strength are mixed in the multicarrier signal. The embodiment is effective when pilot carrier signals including large distortion and pilot carrier signals including small distortion are mixed in the multicarrier signal. Particularly, it is effective when the demodulation section uses only pilot carrier signals including large signal strength for distortion correction.

(Eighth Embodiment)

FIG. 9A is a schematic drawing to show carrier selection sections 31 to 33 of a reception apparatus 107 according to an eighth embodiment of the invention. Each of the carrier selection sections 31 to 33 in the embodiment has a minimum value detection section 35, a removal section 36, and a minimum value detection section 37. Other components of the reception apparatus 107 are similar to those previously described with reference to FIG. 1.

The minimum value detection section 35 and the removal section 36 are similar to the minimum value detection section 35 and the removal section 36 in the seventh embodiment. The minimum value detection section 37 selects pilot carrier signal $PC_3$ including the minimum signal strength from among pilot carrier signals $PC_1$ to $PC_3$ selected by the removal section 36. Thus, in the embodiment, the pilot carrier signal including the second smallest signal strength is selected from among the pilot carrier signals in multicarrier signal. The carrier selection sections 32 and 33 also select the pilot carrier signal including the second smallest signal strength from among the pilot carrier signals in the multicarrier signal.

For example, FIGS. 9B and 9C provide graphs of multicarrier signals received by antenna sections 11 and 12. In the carrier selection section 31, the minimum value detection section 35 detects pilot carrier signal $PC_4$. In the carrier selection section 31, the removal section 36 selects the pilot carrier signals $PC_1$ to $PC_3$. Further, in the carrier selection section 31, the minimum value detection section 37 selects the pilot carrier signal $PC_1$.

On the other hand, in the carrier selection section 32, the minimum value detection section 35 detects pilot carrier signal $PC_8$. In the carrier selection section 32, the removal section 36 selects pilot carrier signals $PC_5$ to $PC_7$. Further, in the carrier selection section 32, the minimum value detection section 37 selects the pilot carrier signal $PC_5$.

An antenna selection section 40 compares the pilot carrier signals $PC_1$ and $PC_5$. Accordingly, the antenna selection section 40 can reliably select the antenna section 11.

The reception apparatus of the embodiment has similar advantages to those of the reception apparatus of the first embodiment. Further, the reception apparatus 107 according to the embodiment can reliably select the antenna with good communication quality if the signal strength of one pilot carrier signal is extremely small and the signal strength of another pilot carrier signal is large. Particularly, it is effective when a demodulation section uses only pilot carrier signals including large signal strength for distortion correction.

(Ninth Embodiment)

Figure 10:
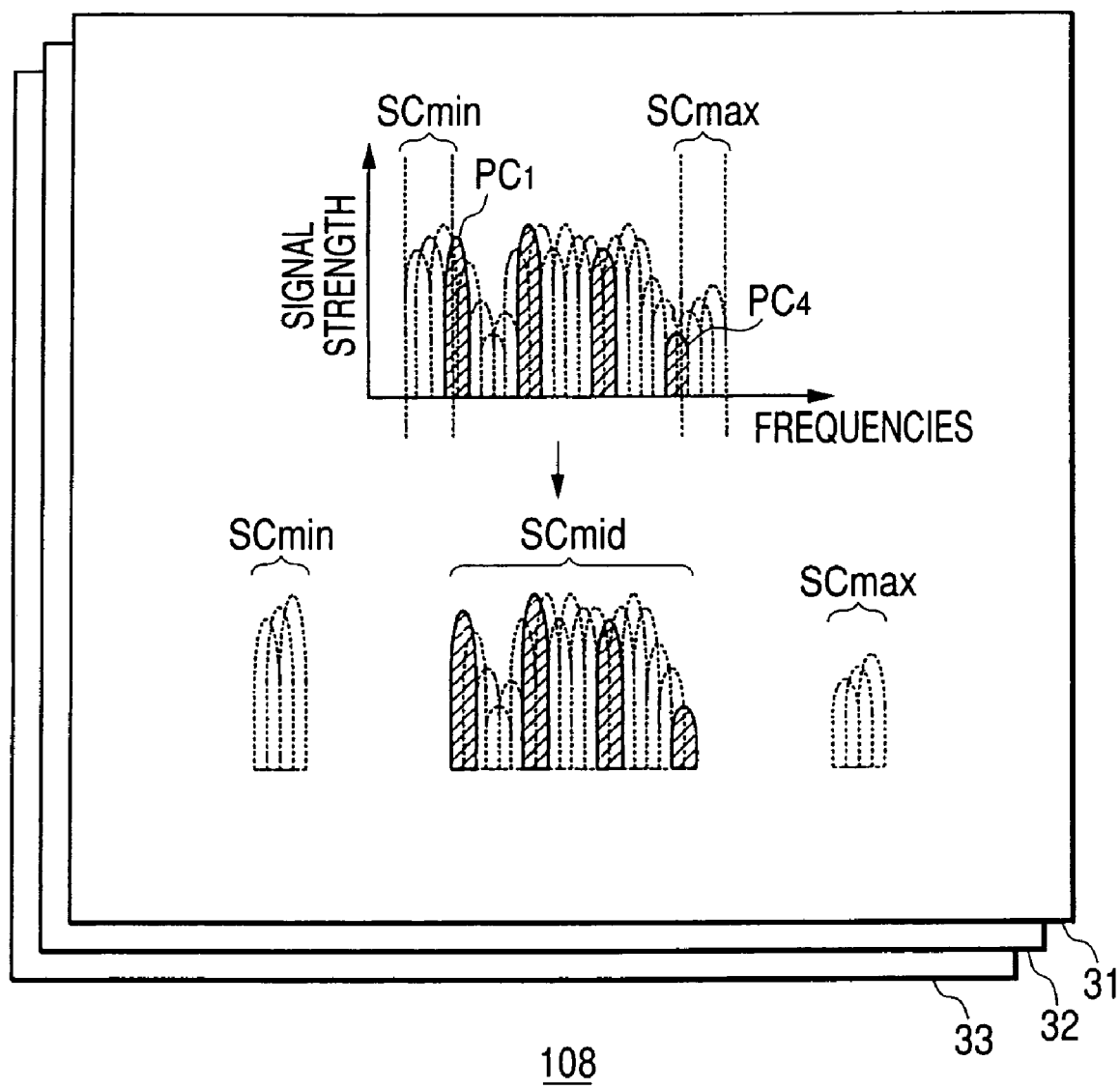
FIG. 10 is a schematic drawing to show carrier selection sections of a reception apparatus according a ninth embodiment of the invention.

FIG. 10 is a schematic drawing to show carrier selection sections 31 to 33 of a reception apparatus 108 according to a ninth embodiment of the invention. The carrier selection section 31 selects a subcarrier signal $SC_{mid}$ between a pilot carrier signal $PC_1$ including the smallest frequency and a pilot carrier signal $PC_4$ including the largest frequency among subcarrier signals. The carrier selection sections 32 and 33 also select a subcarrier signal between a pilot carrier signal including the smallest frequency and a pilot carrier signal including the largest frequency among subcarrier signals. Other components of the reception apparatus 108 are similar to those previously described with reference to FIG. 1.

In an antenna selection section 40, a calculation section 42 calculates average signal strengths $AV_1$ to $AV_3$ of the subcarrier signals $SC_{mid}$ for carrier selection sections 31 to 33. Further, a signal strength comparison section 44 compares the average signal strengths $AV_1$ to $AV_3$ and the antenna selection section 40 selects the antenna section receiving the signal including the largest signal strength.

Usually, a subcarrier signal $PC_{min}$ including a smaller frequency than the pilot carrier signal $PC_1$ including the smallest frequency and a subcarrier signal $PC_{max}$ including a larger frequency than the pilot carrier signal $PC_4$ including the largest frequency do not have large effect on demodulation. Therefore, the reception apparatus 108 can reliably select the antenna with good communication quality by selecting the subcarrier signal $SC_{mid}$. Further, the reception apparatus of the embodiment has similar advantages to those of the reception apparatus of the first embodiment.

(Tenth Embodiment)

Figure 11:
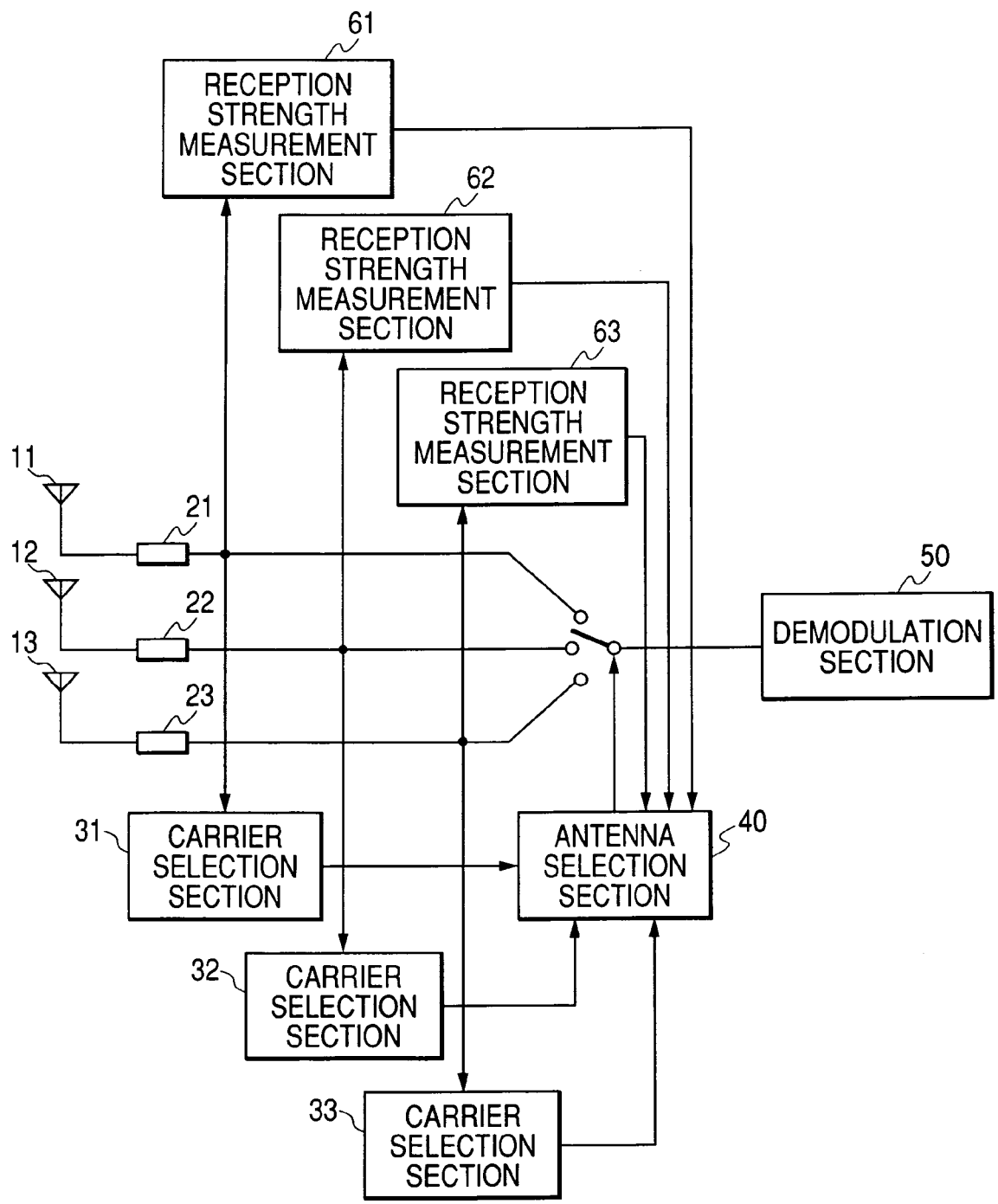
FIG. 11 is a block diagram to show a reception apparatus according to a tenth embodiment of the invention.

FIG. 11 is a block diagram to show a reception apparatus 110 according to a tenth embodiment of the invention. The reception apparatus 110 differs from the reception apparatus of the first embodiment in that it further includes reception strength measurement sections 61 to 63. The reception strength measurement sections 61 to 63 measure the signal strengths of multicarrier signals received through antenna sections 11 to 13. The reception strength measurement sections 61 to 63 measure not only the signal strengths of pilot carrier signals, but also the whole signal strength.

An antenna selection section 40 selects an antenna section based on the combination of the signal strengths of the pilot carrier signals selected by carrier selection sections 31 to 33 and the whole signal strengths measured by the reception strength measurement sections 61 to 63. For example, the antenna selection section 40 selects the antenna section with the largest sum $a*AV_P+b*AV_S$ where $a*AV_P$ is constant a multiplied by average signal strength $AV_P$ of the pilot carrier signals selected by the carrier selection sections 31 to 33 and $b*AV_S$ is constant b multiplied by whole signal strength $AV_S$ measured by the reception strength measurement sections 61 to 63. That is, given weights are assigned and both the pilot carrier signal strength and the whole signal strength are used to select the antenna section.

The reception apparatus of the embodiment has similar advantages to those of the reception apparatus of the first embodiment. Further, in the tenth embodiment, not only the pilot carrier signals, but also other subcarrier signals can be considered for selecting the antenna section. Therefore, the reception apparatus 110 can conduct high-quality communications.

In the first to tenth embodiments, the antenna selection section 40 selects the antenna section based on the signal strengths of the subcarrier signals selected by the carrier selection sections 31 to 33. However, the antenna selection section 40 may select the antenna section based on EVM (Error Vector Magnitude) values of the subcarrier signals selected by the carrier selection sections 31 to 33. In this case, the expression "signal strength" in this specification may be replaced with "EVM value."

(Eleventh Embodiment)

Figure 12:
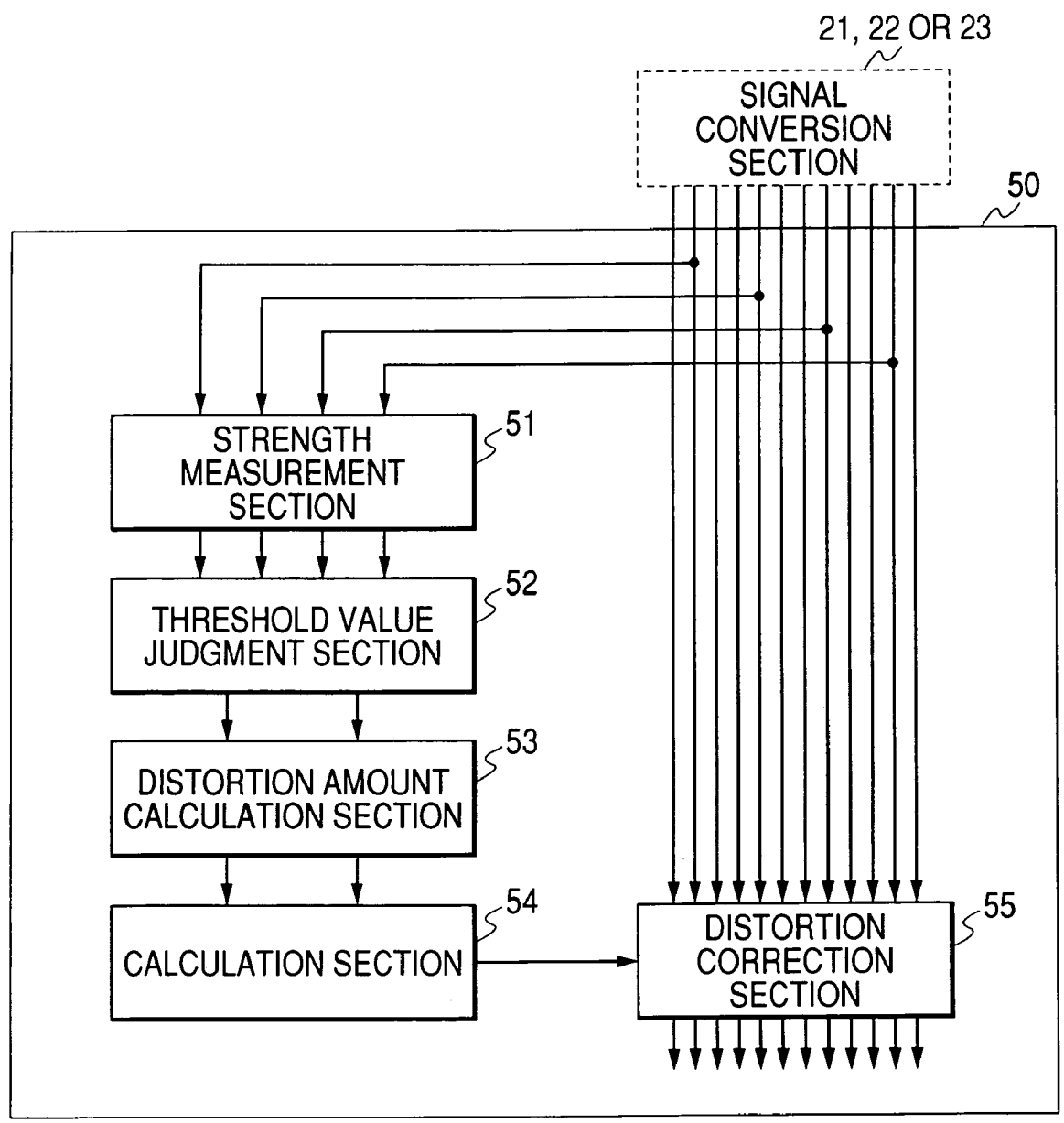
FIG. 12 is a block diagram to show a demodulation section of a reception apparatus according to an eleventh embodiment of the invention.
Figure 13:
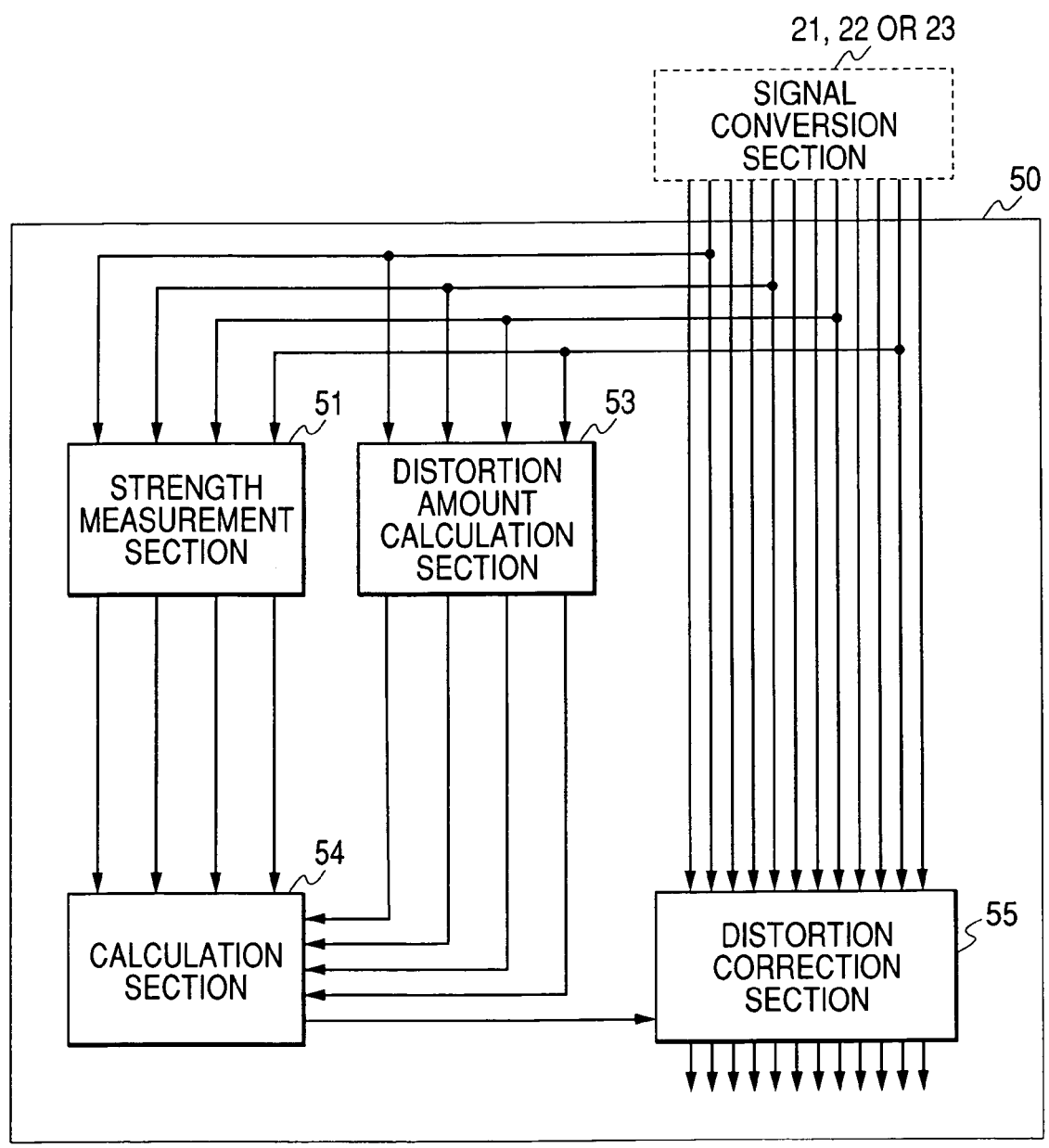
FIG. 13 is a block diagram to show a demodulation section of a reception apparatus according to a twelfth embodiment and a thirteenth embodiment of the invention.
Figure 14:
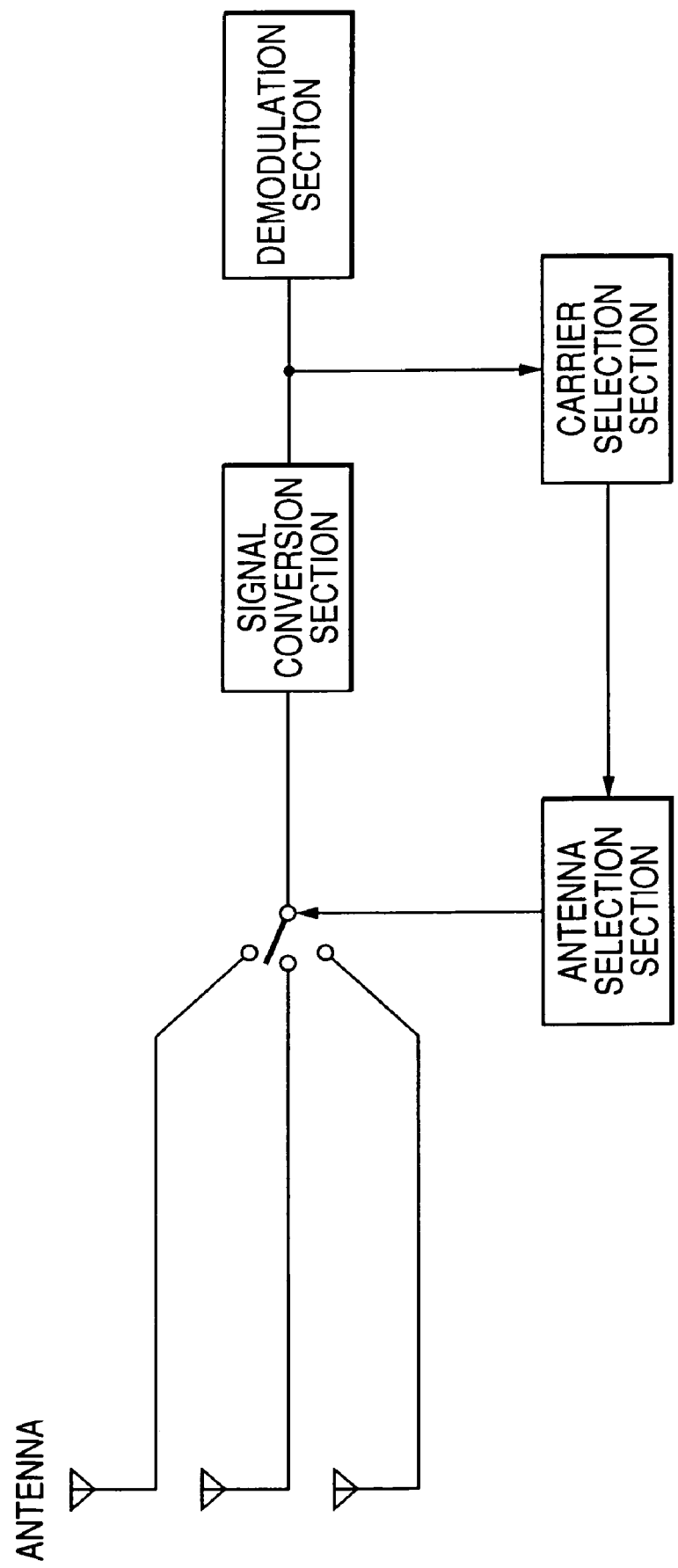
FIG. 14 is a block diagram to show a reception apparatus according to one aspect of the invention.

FIG. 12 is a block diagram to show a demodulation section 50 of a reception apparatus 120 according to an eleventh embodiment of the invention. After an antenna selection section 40 selects an antenna section, the demodulation section 50 demodulates the multicarrier signal received through the selected antenna section. Other components of the reception apparatus 120 may be similar to those previously described with reference to FIG. 1. In FIGS. 12 and 13, a plurality of signals from a signal conversion section to a distortion correction section 55 indicate flows of subcarrier signals.

The demodulation section 50 has a strength measurement section 51, a threshold value judgment section 52, a distortion amount calculation section 53, a calculation section 54, and the above-mentioned distortion correction section 55. The demodulation section 50 receives a multicarrier signal from a signal conversion section 21. The strength measurement section 51 measures the signal strength of each pilot carrier signal in the multicarrier signal. The threshold value judgment section 52 has a threshold value concerning the signal strength and selects each pilot carrier signal including the signal strength equal to or larger than the threshold value.

The distortion amount calculation section 53 measures the distortion amount of the pilot carrier signal selected by the threshold value judgment section 52. Usually, the reception apparatus 120 already knows the phase and frequency of the pilot carrier signal when the signal is transmitted from the communicating party, for example. Therefore, the distortion amount calculation section 53 can calculate the phase difference between the pilot carrier signal at the transmitting time and that at the receiving time as the distortion amount.

The calculation section 54 calculates a distortion correction value from the distortion amount provided by the distortion amount calculation section 53. For example, if the threshold value judgment section 52 selects a plurality of pilot carrier signals, the calculation section 54 can calculate the average value of a plurality of distortion amounts and adopt the average value as the distortion correction value.

The distortion correction section 55 corrects each subcarrier signal in accordance with the distortion correction amount. For example, the distortion correction section 55 restores the phase of each subcarrier signal by the phase difference calculated by the calculation section 54. After the distortion of each subcarrier signal is corrected, the multicarrier signal is sent to a decoding section (not shown).

The pilot carrier signal including small signal strength often is distorted largely. If such a pilot carrier signal is used to make distortion correction, the demodulation section 50 cannot precisely correct the subcarrier signal. Therefore, only pilot carrier signals including the signal strength equal to or larger than one threshold value as in the embodiment, whereby it is made possible for the demodulation section 50 to precisely correct the subcarrier signal. Consequently, the reception apparatus 120 can be provided with high-quality reception characteristics.

The embodiment can be combined with any of the first to tenth embodiments, so that the embodiment can also have the advantages of any of the first to tenth embodiments. Particularly, the embodiment and the fourth embodiment are used in combination, the demodulation section 50 and the carrier selection sections 31 to 33 can use the common threshold value Th.

(Twelfth Embodiment)

FIG. 13 is a block diagram to show a demodulation section 50 of a reception apparatus 121 according to a twelfth embodiment of the invention. The reception apparatus 121 differs from the reception apparatus 120 of the eleventh embodiment in that a calculation section 54 assigns a weight to the distortion amount using the signal strength of each pilot carrier signal and then calculates a distortion correction value.

The calculation section 54 acquires the signal strength of each pilot carrier signal from a strength measurement section 51 and acquires the distortion amount of each pilot carrier signal (for example, the phase difference) from a distortion amount calculation section 53. The calculation section 54 assigns a weight to the distortion amount based on the signal strength and then calculates a distortion correction value. For example, the calculation section 54 multiplies the ratio of the signal strengths of pilot carrier signals by the distortion amount and further adds the results together to find the distortion correction value.

Specifically, assume that the ratio of the signal strengths of pilot carrier signals PC1, PC2, and PC3 is 0.5:0.2:0.3 and that the phase differences between PC1 and PC2, between PC1 and PC3, and between PC2 and PC3 are 10 degrees, 20 degrees, and 30 degrees respectively. In this case, the calculation section 54 calculates $(0.5/1)*10+(0.2/1)*20+(0.3/1)*30$. As a result, the calculation section 54 adopts 18 degrees as the distortion correction value.

Generally, the pilot carrier signal including small signal strength often is distorted largely and thus the higher the signal strength of the pilot carrier signal, the higher the reliability of the distortion amount. Therefore, in the embodiment, a weight can be assigned in response to the reliability of the pilot carrier signal, so that the distortion amount of any other subcarrier signal can be corrected precisely. Consequently, the reception apparatus 121 can be provided with high-quality reception characteristics.

(Thirteenth Embodiment)

A reception apparatus according to a thirteenth embodiment of the invention will be discussed with reference to FIG. 13. In the embodiment, a calculation section 54 acquires the signal strength of each pilot carrier signal from a strength measurement section 51 and acquires the distortion amount of each pilot carrier signal (for example, the phase difference) from a distortion amount calculation section 53.

Each pilot carrier signal can be represented by a vector according to the signal strength and distortion amount of the pilot carrier signal. The calculation section 54 combines the vectors into one composite vector. Further, the calculation section 54 obtains the distortion correction value from the angle of the composite vector.

In the embodiment, as in the twelfth embodiment, not only the distortion amount of each pilot carrier signal, but also the signal strength is considered for calculating the distortion correction value. Therefore, the reception apparatus of the embodiment has similar advantages to those of the reception apparatus of the twelfth embodiment.

The twelfth and thirteenth embodiments may be combined with the eleventh embodiment, so that the twelfth and thirteenth embodiments can also obtain the advantages of the eleventh embodiment.

(Fourteenth Embodiment)

Figure 15:
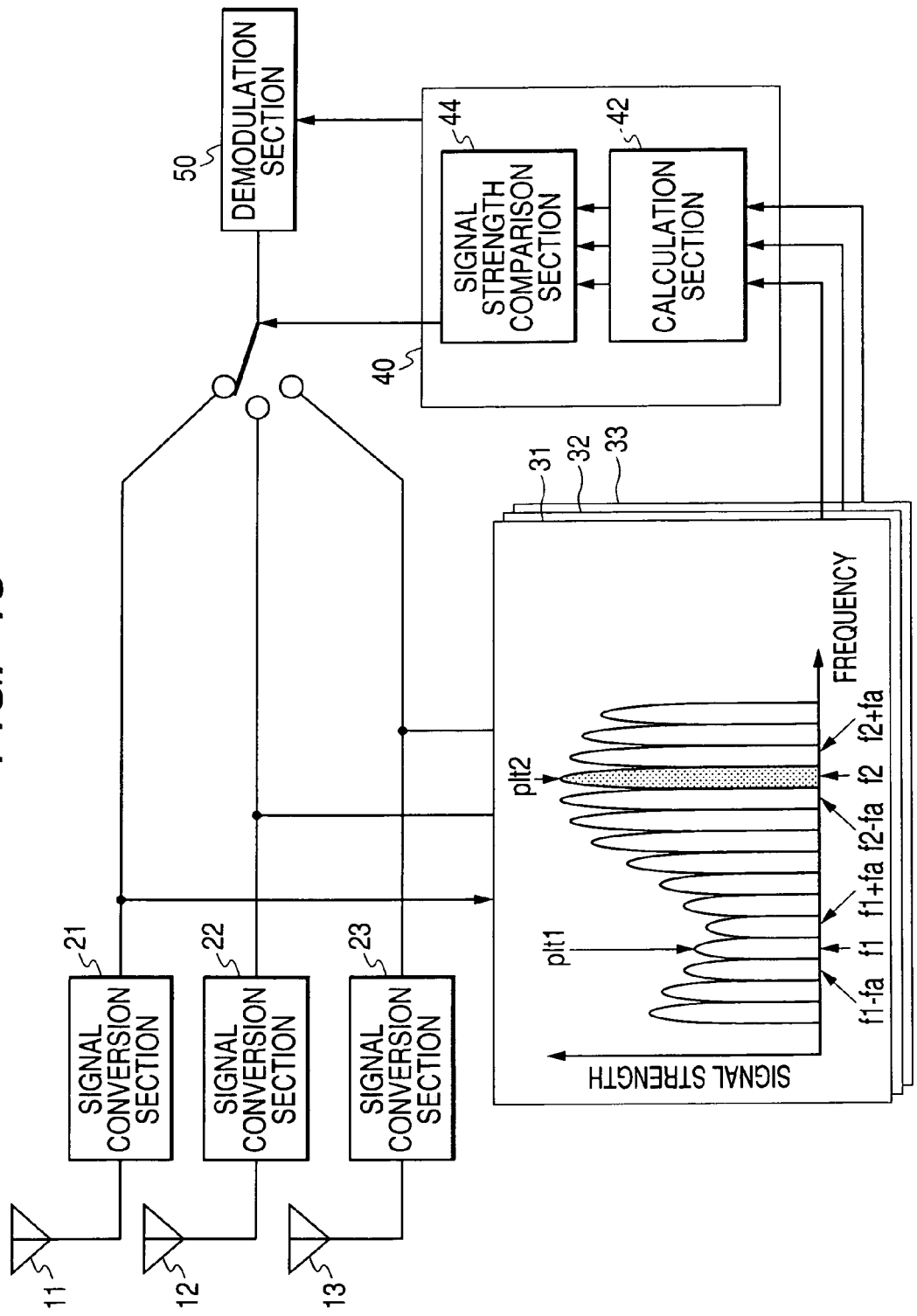
FIG. 15 is a schematic diagram which shows a frequency characteristic of a reception signal according to fourteenth embodiment of the invention.

A pilot carrier signal including a frequency near a frequency of the pilot carrier signal is selected in the fourteenth embodiment. FIG. 15 is a block diagram to show radio reception apparatus according to the fourteenth embodiment. Plural antenna sections 11 to 13, plural signal conversion section 21 to 23, plural carrier selection sections 31 to 33, antenna selection section 40, and demodulation section 50 are provided with the radio reception apparatus as shown in FIG. 15. each of the antenna sections 11 to 13 receives multi-carrier signal which transmitted from the transmitter (not shown).

The numbers of signal conversion sections 21 to 23 and the carrier selection sections 31 to 33 are as same as that of the antenna sections 11 to 13 in accordance with the antenna sections. Three antenna sections, three signal conversion sections, and three carrier selection sections are provided with FIG. 15 as an example, but the number is not limited.

Each of the carrier selection sections 31 to 33 selects at least one sub carrier signal having frequencies each of which is respectively near the plural pilot sub carriers among multi-carrier signals which pass the corresponding signal conversion section. The demodulation section 50 demodulates the multi carrier signal which is received at the antenna section selected in the antenna section.

The carrier selection sections 31 to 33 selects a sub carrier signal in accordance with a characteristic graph as shown in FIG. 15. a signal waveform of the multi-carrier signals are shown in the graph in which a horizontal axis shows a frequency, and a vertical axis shows a signal strength. As shown in the graph, the multi-carrier signals have plural sub carrier signals which have different frequency bans from one another. Plural known pilot carrier signals are provided with the multi-carrier signals. (Frequency f1, f2 in the graph)

The carrier selection sections 31 to 33 selects four sub carrier signals f1−fa, f1+fa, f2−fa, and f2+fa which are nearest from the pilot carrier signals corresponding to f1 and f2.

The sub carrier signals selected in the carrier selection sections 31 to 33 are transmitted to the antenna selection section 40.

The antenna selection section 40 has calculation section 42 and signal strength comparison section 44. the calculation section 42 calculates AV1 which is an signal strength average among sub carrier signals SC1, SC2, SC3, and SC4 which are selected by the carrier selection section 31, AV2 which is a signal strength average of the sub carrier signals selected by the carrier selection section 32, and AV3 which is a signal strength average of the sub carrier signals selected by the carrier selection section 33, respectively.

The signal strength comparison section 44 compares the signals strength averages AV1, AV2, and AV3 and selects antenna section which has a maximum signal strength average among antenna sections 11 to 13.

According to the fourteenth embodiment, the carrier selection sections 31 to 33 select four sub carrier signals, but may select no more than three sub carrier signals or no fewer than five sub carrier signals. Accordingly, the above described example, each of sub carrier signals which are nearest from the pilot carrier signal at both sides thereof are selected, but plural sub carrier signals at both sides which are nearest from the pilot carrier signal may be selected, and the sub carrier signal which are nearest from the pilot carrier signal at one side thereof may be selected. In addition, a number of pilot carrier signals which are included in the multi-carrier signal is not limited in two. Further, the sub carrier signals having a frequency except for a frequency which is nearest from the frequency of the pilot carrier signal may be selected.

Figure 16:
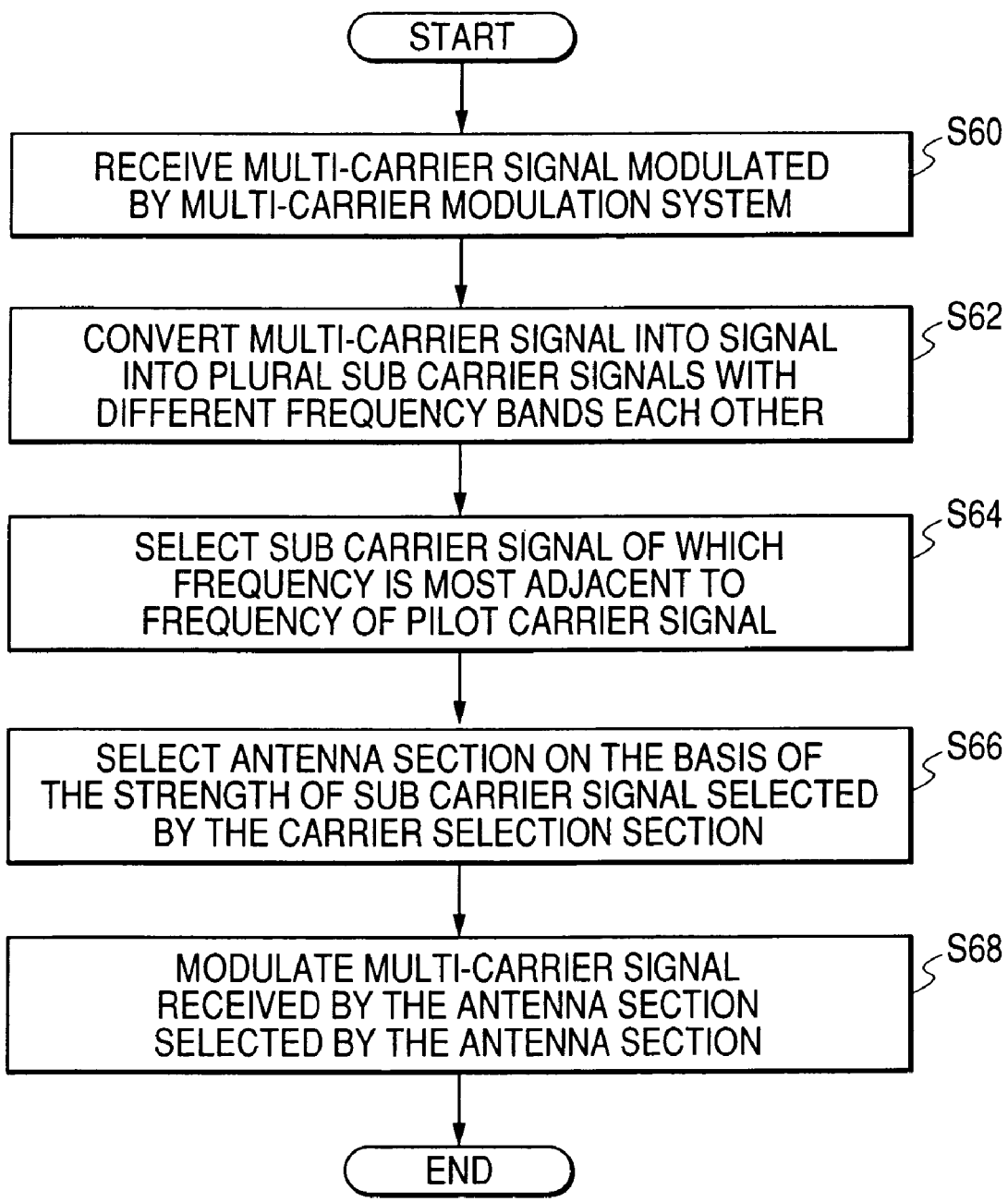
FIG. 16 is a flow chart to show an example of processing operation of the radio reception apparatus as shown in FIG. 15.

FIG. 16 is a flow chart to show an example of processing operation of the radio reception apparatus as shown in FIG. 15. First, the antenna sections 11 to 13 receives multi carrier signals modulated by multi carrier modulation method. (Step 60) Then, each of the signal conversion sections 21 to 23 converts the multi carrier signals received from the antenna sections 11 to 13. Thus, the multi carrier signals are converted into a signal in which sub carrier signals have a different frequency with one another. (Step 62)

Next, the carrier selection sections 31 to 33 respectively select plural sub carrier signals which have a nearest frequency from the frequency of the pilot carrier signal. (Step 64)

The antenna section 40 selects an antenna section which receives the multi carrier signal on the basis of the signal strength of the sub carrier signals selected by the carrier selection sections 31 to 33. the demodulation section 50 demodulates the multi carrier signals received by the antenna section selected by the antenna section 40. (Step 68)

The demodulation section 50 does not perform the demodulation until the antenna selection section 40 selects the antenna. The demodulation section 50 receives a signal indicating that the antenna selection section 40 selects the antenna. After the demodulation section 50 receives the signal, the demodulation section 50 performs the demodulation. Thus, power consumption of the demodulation section 50 can be decreased. The demodulation section 50 does not demodulate a signal having a less communication quality by mistake.

According to the fourteenth embodiment, the antenna section can be selected on the basis of a signal strength of a certain sub carrier signal in a predetermined frequency band. In particular, it can be more effective in case that the pilot carrier signals are not inadvertently transmitted when the carrier is selected and that the antenna section selects a pilot carrier signal having large signal strength thereof which have much effect on the demodulation. In the fourteenth embodiment, even if the pilot carrier signals are not received, sub carrier signals which are near from the pilot carrier signal are selected. The sub carrier signals near from the pilot carrier signal has a high mutual relation with the pilot carrier signal with respect to a signal strength, so that the antenna section having high communication quality can be selected as well as in case the antenna section is selected on the basis of the pilot carrier signal.

(Fifteenth Embodiment)

In the fifteenth embodiment, the construction of the antenna selection section 40 is different from that of the fourteenth embodiment.

Figure 17:
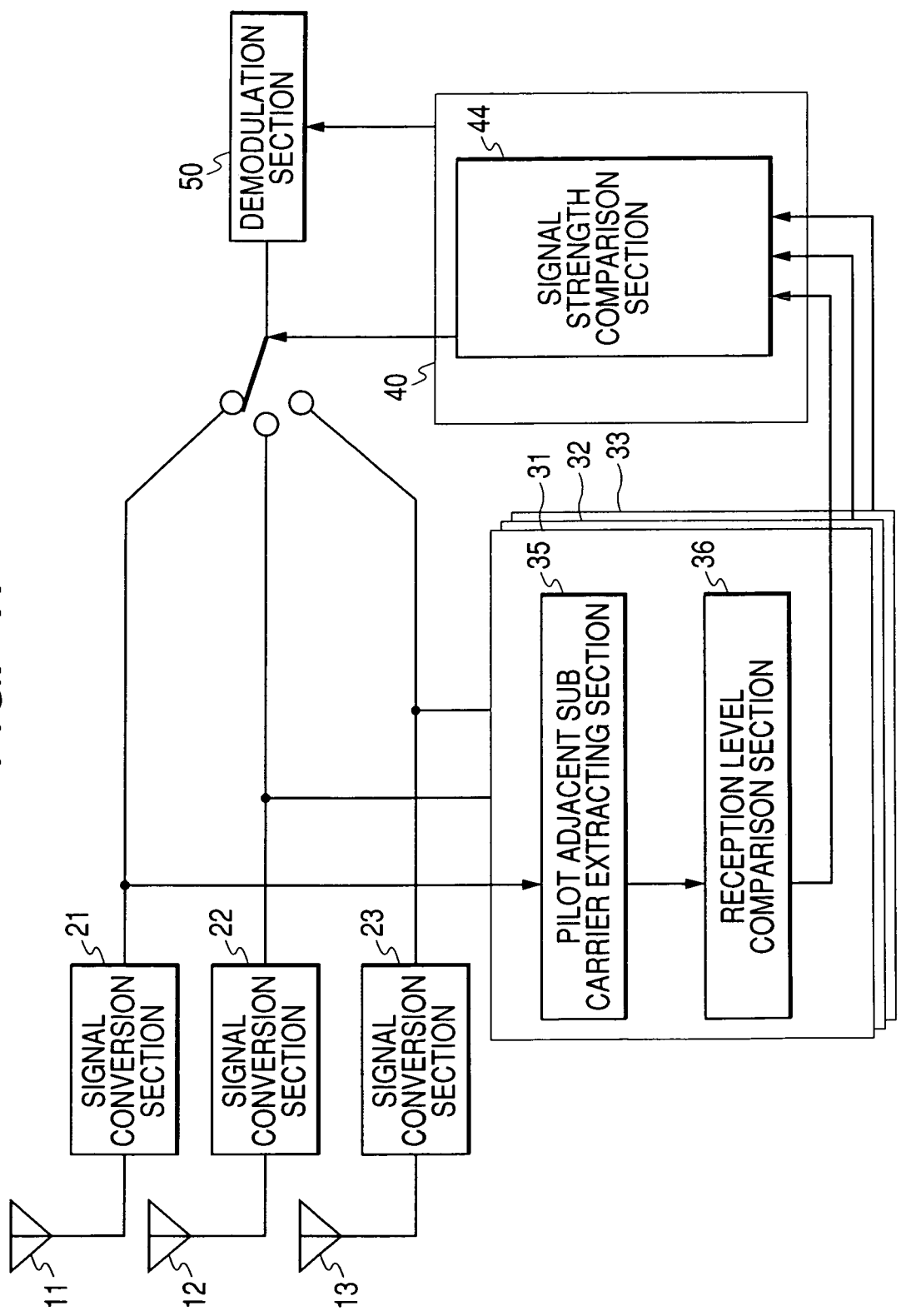
FIG. 17 is a block diagram to show internal construction of the radio reception apparatus according to the fifteenth embodiment.

FIG. 17 is a block diagram to show internal construction of the radio reception apparatus according to the fifteenth embodiment. The radio reception apparatus has a same construction of the apparatus as shown in FIG. 15 other than the internal construction of the antenna selection section 40. The antenna selection section 40 as shown in FIG. 17 includes pilot adjacent carrier extraction section 35 and reception level comparison section 36. The pilot adjacent carrier extraction section 35, in each antenna section, selects sub carrier signal having a minimum reception strength among sub carrier signals which include a nearest frequency from the frequency of the pilot carrier signal. The reception level comparison section 36 includes selects an antenna section which is corresponding to the sub carrier signal having a maximum signal reception strength among the sub carrier signals extracted from the pilot adjacent carrier extraction section 35.

The pilot adjacent carrier extraction section 35 selects a sub carrier signal having a minimum signal reception strength since the smaller the signal reception strength is, the more effective the noise is. The reception level comparison section 36 selects the corresponding antenna section by extracting the sub carrier signal having a maximum signal reception strength among the sub carrier signals susceptible from the effectiveness of the noise.

Thus in the fifteenth embodiment, the sub carrier signal having a small signal reception strength is selected and compared instead of average of the sub carrier signal reception strength, so that the effectiveness of the noise is not receptive.

(Sixteenth Embodiment)

In the sixteenth embodiment, all carrier selection sections share signal conversion section and carrier selection section.

Figure 18:
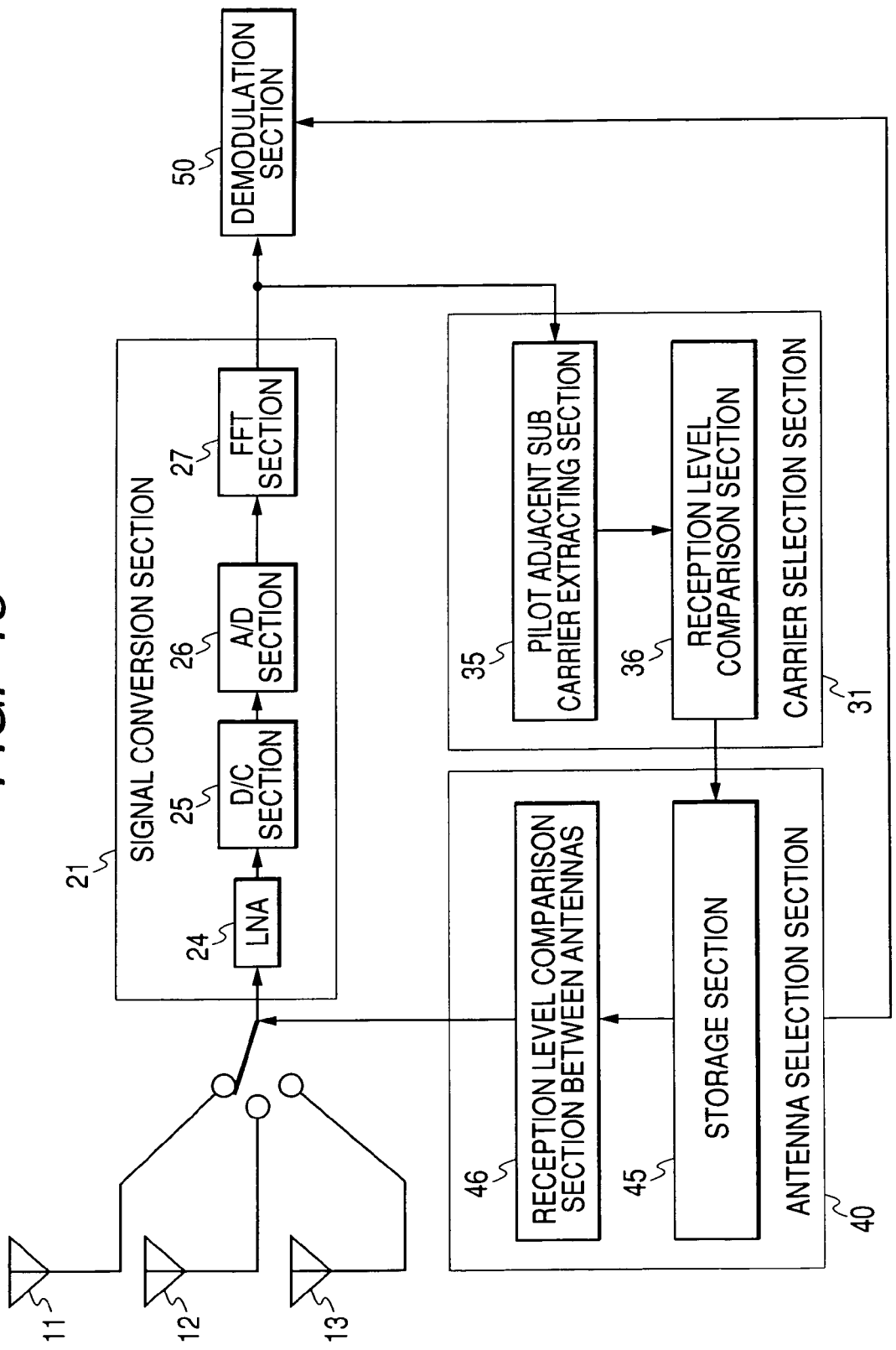
FIG. 18 is a block diagram to show an internal construction of the radio reception apparatus according to the sixteenth embodiment.

FIG. 18 is a block diagram to show an internal construction of the radio reception apparatus according to the sixteenth embodiment. The radio reception as shown in FIG. 18 includes plural antenna sections 11 to 13, a signal conversion section 21 shared by each antenna section, and a demodulation section 50.

The signal conversion part 21 includes LNA (Low Noise Amplifier) which amplifies a multi-carrier signal, a D/C (Down Converter) part which frequency-converts frequency of a multi-carrier signal into a base band, an A/D conversion part which converts an analog signal into a digital signal, and a FFT (Fast Fourier Transfer) part which carries out discrete Fourier conversion to each of multi-carrier signals. A multi-carrier signal, which passed through the signal conversion part 21, has a plurality of sub carrier signals with different frequency bands each other.

The carrier selection section 31 is connected to output of the FFT section 27 of the signal conversion section 21. The carrier selection section 31 includes the pilot adjacent carrier extraction section 35 and signal reception strength comparison section 36. The pilot adjacent carrier extraction section 35 selects at least one signal among the sub carrier signals which has a nearest frequency from each frequency of plural pilot sub carrier signals among multi carrier signals input from the FFT section 27. The signal reception strength comparison section 36 selects and output a sub carrier having a minimum signal reception strength among the sub carriers extracted from the pilot adjacent carrier extraction section 35 to the antenna selection section 40.

The antenna selection section 40 includes storage section 45 in which an information of the sub carrier selected by the carrier selection section 31 is stored and reception level comparison section between antenna 46 which can determine which antenna is selected by performing a comparison on the basis of the stored information in the storage section 45.

First, the antenna selection section 40 selects an antenna section 11. The signal conversion section 21 converts a signal received in the antenna section 11. The carrier selection section 31 selects a sub carrier having a minimum signal reception level among sub carriers which has nearest frequency from that of each of the plural pilot sub carrier. The storage section 45 of the antenna selection section 40 stores the information.

Next, the antenna selection section 40 selects the antenna section 12, performs same processing as the antenna section 11, and stores the information in the storage section 45 of the antenna selection section 40.

Then, the antenna selection section 40 selects the antenna section 13, performs same processing as the antenna section 12, and stores the information in the storage section 45 of the antenna selection section 40.

The reception level comparison section between antenna 46 selects an antenna which having a maximum signal reception level of the sub carrier selected on the basis of the information stored in the storage section of the antenna selection section 40.

Figure 19:
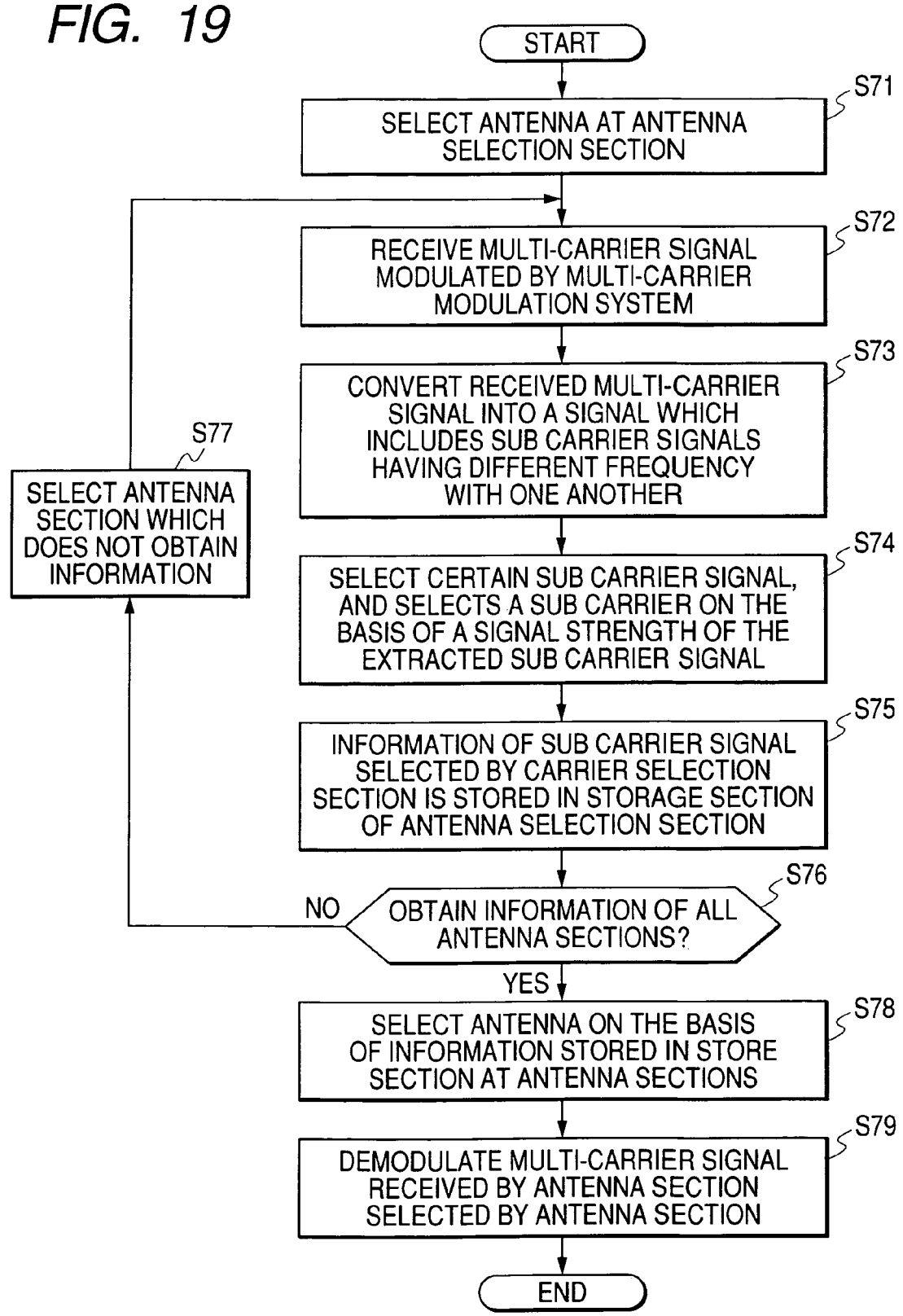
FIG. 19 is a flow chart to show one example of processing operation of the radio reception apparatus as show in FIG. 18.

FIG. 19 is a flow chart to show one example of processing operation of the radio reception apparatus as show in FIG. 18. First, the antenna selection section 40 selects on of the antenna sections. (Step S71) Next, the selected antenna section receives a multi-carrier signal. (Step S72) Next, the signal conversion section 21 converts a received multi-carrier signal into a signal which includes sub carrier signals having different frequency with one another. (Step S73) Next, the carrier selection section 31 selects a certain sub carrier signal, and selects a sub carrier on the basis of a signal strength of the extracted sub carrier signal. (Step S74) Then, the information of the sub carrier signal selected by the carrier selection section 31 is stored in the storage section 45 of the antenna selection section. (Step S75)

Next, whether or not all antenna sections complete a processing is determined (Step 76), one of the antenna sections is selected and Step S71 to S76 are repeated, if the antenna section does not complete the above-processing.

Then, the reception level comparison section between antennas 46 selects antenna section when all antenna sections complete the processing. (Step S78)

The multi-carrier signal received in the antenna section selected by the antenna selection section 40 is transmitted to the demodulation section 50, and the demodulation processing is performed. (Step S79)

The radio reception apparatus of FIG. 18 has only one pair of the signal conversion section 21 and the carrier selection section 31, so that the apparatus selects the antenna sections in turn, performs the processing in the signal conversion section 21 and the carrier selection section 31, and stores the information of the sub carrier signal corresponding to each antenna section in the storage section 45. When the multi-carrier signal is transmitted in a form of the packet, the processing as show in FIG. 19 may be performed at the step that the preamble section of the packet is received before receiving the data section of the packet.

Figure 20:
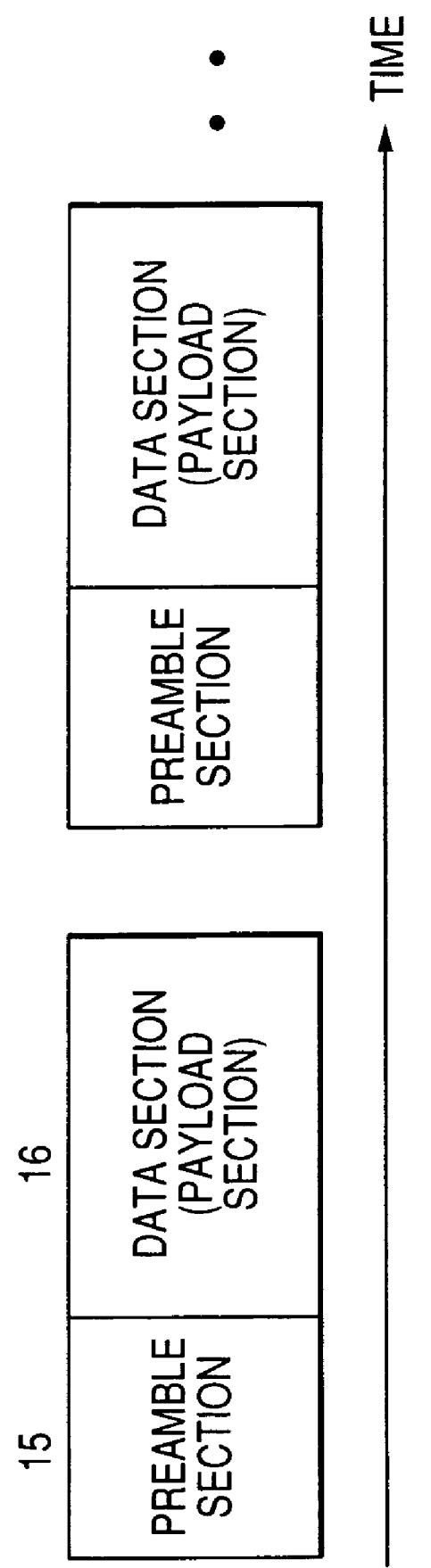
FIG. 20 shows a data construction of the packet. As show in FIG. 20.

FIG. 20 shows a data construction of the packet. As show in FIG. 20, each packet has a preamble section 15 and a data section 16. each of the preamble section 15 and the data section 16 is configured by the multi-carrier signal, so that in the embodiment, the processing as show in FIG. 19 is performed by the preamble section of the packet. When the antenna section is selected by the data section 16, it is a risk that gain control and correction of the transmission channel have inappropriate values. Thus, in the embodiment, unit the data section 16 of the packet is received, the selection of the antenna section, the correction of the transmission channel, and correction of the transmission channel after D/C section are performed by using the preamble section of the packet.

Thus, in the sixteenth embodiment, all antenna sections share one pair of the signal conversion section 21 and the carrier selection section 31, so that it is not necessary to provide the signal conversion section 21 and the carrier selection section 31 with each antenna section, the internal construction of the radio reception apparatus becomes simple. Thus, it is possible to decrease the electric power consumption and to make the apparatus miniaturization. Further, the appropriate antenna section is selected by the processing as show in FIG. 19, so that an antenna section having a high communication quality may be certainly selected. Further more, the antenna section is selected on the basis of the preamble section of the received packet, so that timely processing of the received data (Real Time Processing) can be performed.

(Seventeenth Embodiment)

In the seventeenth embodiment, a processing in the carrier selection section 31 is accelerated.

Figure 21:
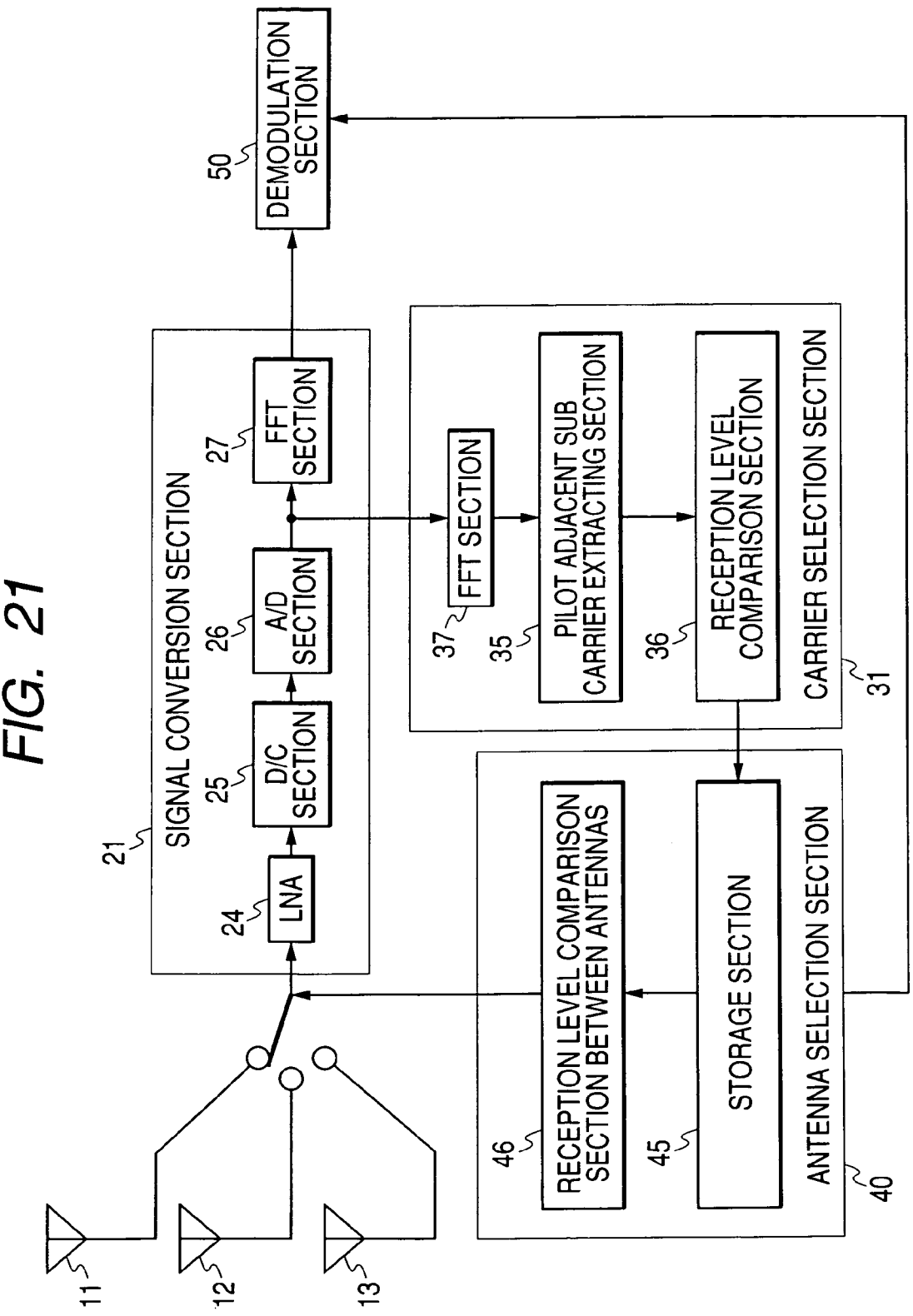
FIG. 21 is a block diagram to show a construction of the radio reception apparatus according to the seventeenth embodiment.

FIG. 21 is a block diagram to show a construction of the radio reception apparatus according to the seventeenth embodiment. The radio reception apparatus as show in FIG. 21 have a different internal construction of the carrier selection section from that of the apparatus as show in FIG. 18.

In FIG. 21, the carrier selection section 31 in the radio reception apparatus has FFT section 37 other than FFT section 27 within the signal conversion section 21. output signal of A/D section within the signal conversion section 21 is input into the FFT section 37. the reason of the FFT 37 section is as follow:

It is necessary to perform the selection of the antenna section, a gain control of the signal received by the antenna section, and the correction of the transmission channel after D/C section in the radio reception apparatus of FIG. 21. when the antenna is changed in the data section 16 of the packet, the gain control and the correction of the transmission channel are performed.

Figure 22:
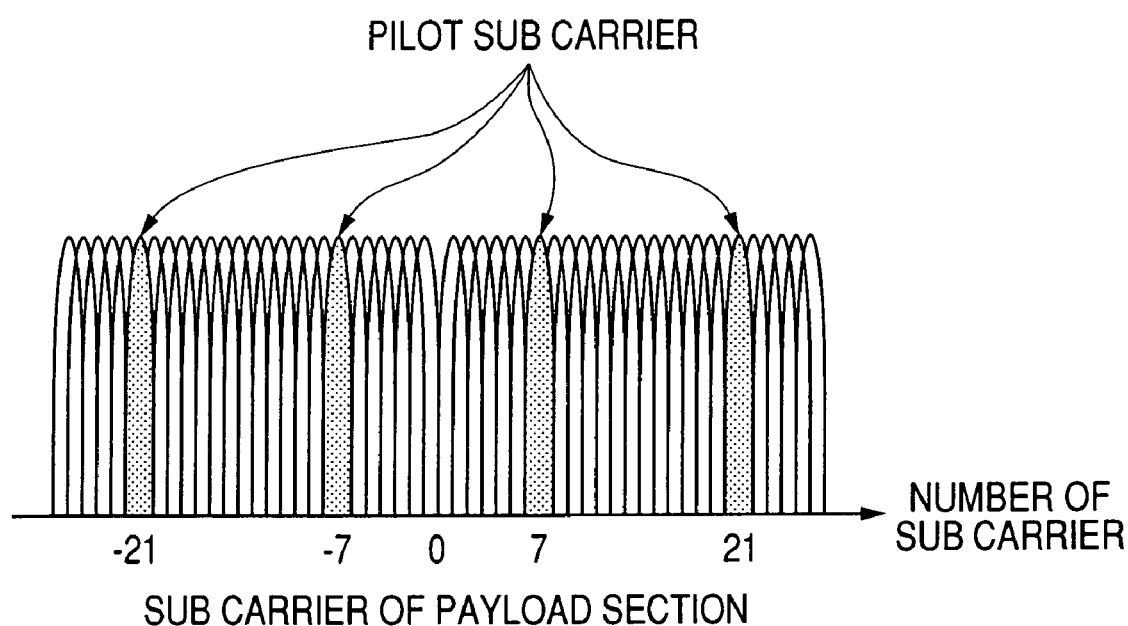
Figure 23:
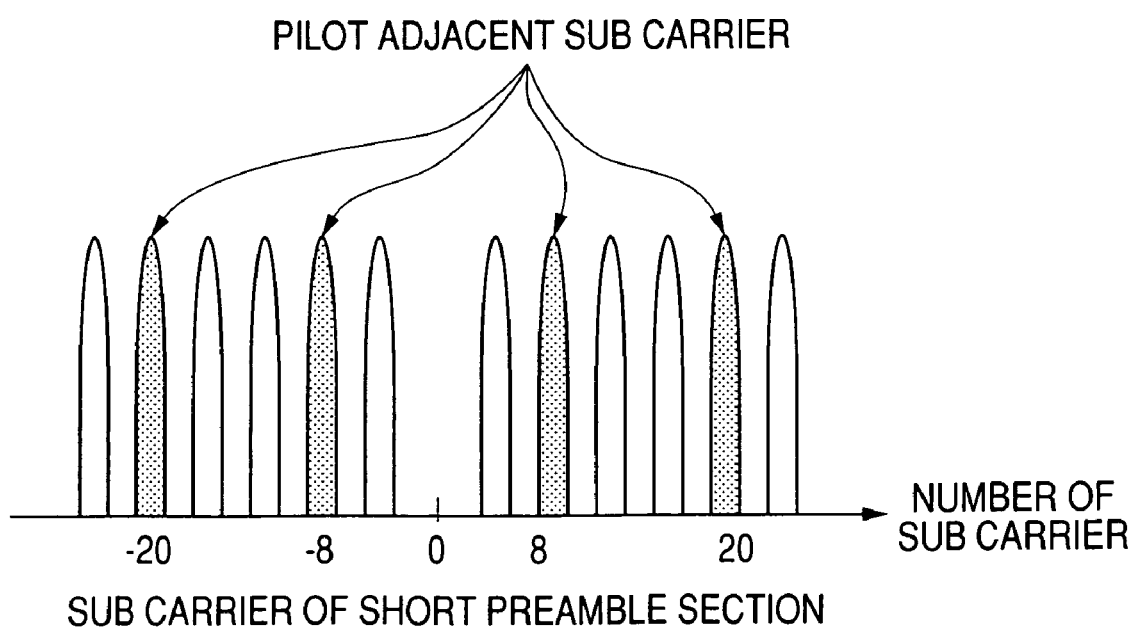

FIG. 22 represents a frequency characteristic of a data part of a packet which was complied with IEEE802.11a. A horizontal axis corresponds to frequency, and a vertical axis represent a signal level. It is composed of 52 pieces of sub y carriers from +26 up to −26, except for 0. Sub carriers of −21, −7, +7, +21 are pilot carriers. On one hand, Fig. represents a frequency characteristic of a short preamble, which is a part of a preamble part of the packet which was complied with IEEE802.11a. A horizontal axis corresponds to frequency, and a vertical axis represents a signal level. Unlike the data part, it is composed of 12 pieces of sub carriers of +24, +20, +16, +12, +8, +4, −4, −8, −12, −16, −20, −24, and there exists no sub carrier with a frequency component which is comparable to a pilot carrier of the data part.

In this connection, in order to select a sub carrier with high correlation with a pilot sub carrier, selected is a sub carrier which is of the nearest frequency to each of a plurality of pilot sub carriers. That is, selected are sub carriers of −20, −8, +8, +20.

In addition, by utilizing a characteristic of a configuration of a short preamble of Fig., electric power measurement of each sub carrier is possible with shorter time than usual. Usually, i.e., in a configuration of a data part, there is a necessity to carry out Fourier conversion with time of Tk=1/fk, inverse number of fundamental frequency fk of a sub carrier in which sub carrier number is of the nearest to 0, rather than orthogonality of OFDM, and to measure reception strength. However, in the configuration of Fig., since fundamental frequency is 4*fk, 4 times, and further, only a frequency component of its constant number multiple exists, it is possible to carry out Fourier conversion and measurement of reception strength with time of Tk/4=1/(4*fk). That is, it is possible to measure signal strength with time of ¼ multiple.

In this embodiment, even in case that a pilot carrier does not exist in a preamble part, in packet communication, it is possible to select a carrier with a high correlation with a pilot carrier, and on the basis of signal strength of that carrier, to carry out antenna selection. By this, the communication apparatus 101 can surely select an antenna with good communication quality.

(Eighteenth Embodiment)

The eighteenth embodiment is a modification of the embodiment of FIG. 17. The internal construction of the carrier selection section 31 is different from that of the carrier selection section as show in FIG. 21.

Figure 24:
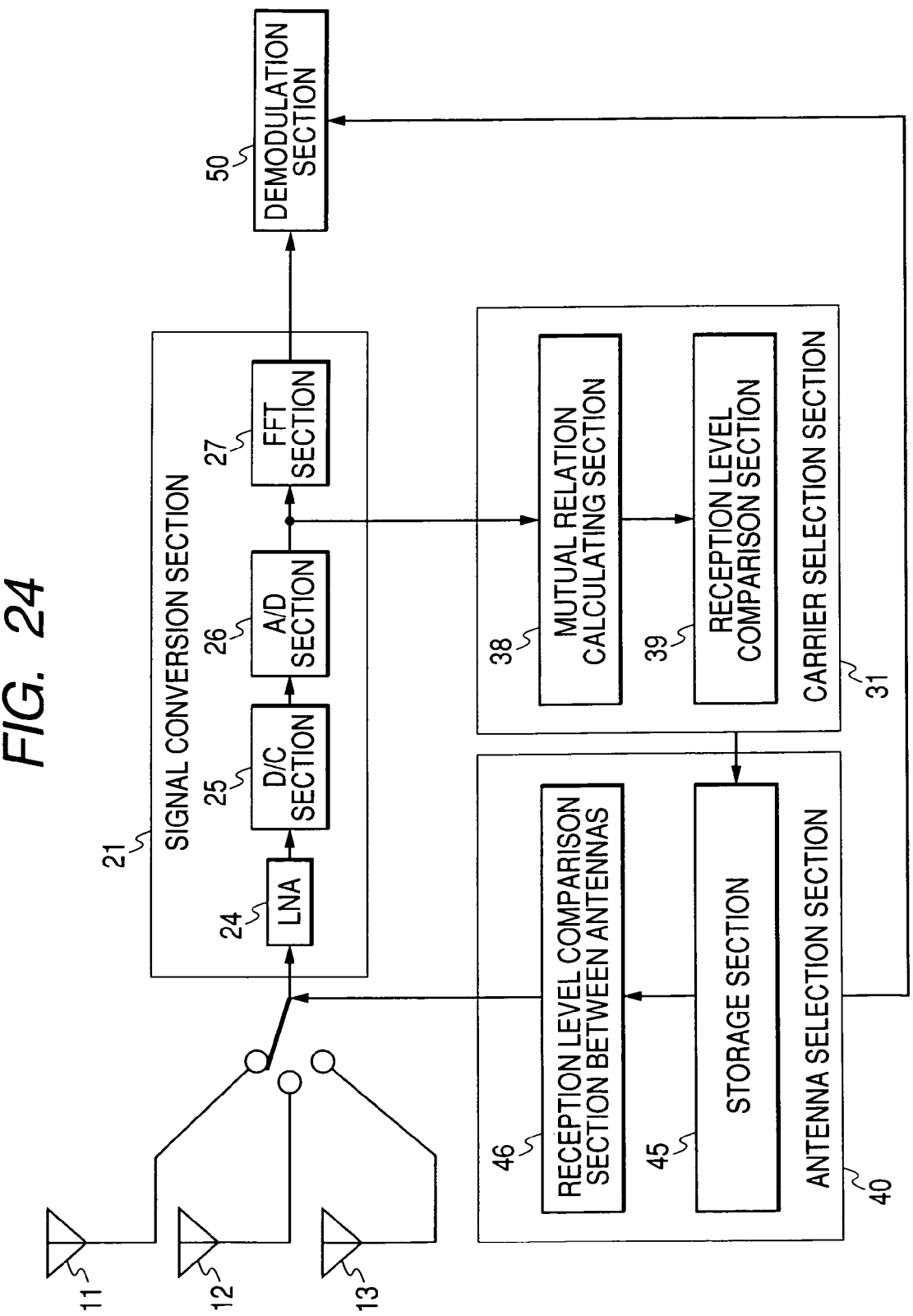
FIG. 24 is a block diagram to show the construction of the radio reception apparatus according to the eighteenth embodiment.

FIG. 24 is a block diagram to show the construction of the radio reception apparatus according to the eighteenth embodiment. The carrier selection section 31 in the apparatus of FIG. 24 has a mutual relation calculating section 38 and a reception level comparison section 36. The mutual relation calculating section 38 calculates a mutual relation degree with a frequency of the sub carrier signal included in the multi-carrier signal. A frequency of the pilot carrier signal is unknown, so that the sub carrier signal having a frequency which is nearest from the frequency of the pilot carrier signal is extracted by calculating the mutual relation degree with a frequency which is nearest from the frequency of the pilot carrier signal.

Thus, in the eighteenth embodiment, the sub carrier signal having a frequency which is nearest from the frequency of the pilot carrier signal can be extracted without FFT section and pilot adjacent carrier extraction section within the carrier selection section 31, so that the internal construction of the carrier selection section 31 makes simple, and the miniaturization of the apparatus and the decrease of the electric power consumption can be achieved.

(Nineteenth Embodiment)

In the embodiments of FIGS. 16 and 17, the selection of the antenna section is performed on the basis of the preamble section 15 of the packet as an example. However, according algorithm of the signal conversion section 21 and the demodulation section 50, there is an unimportant pilot carrier signal. For example, in IEEE802.11a, the pilot carrier signal is mainly used for frequency correction and phase correction, but all four pilot sub carrier signals are always necessary. Thus, there is algorithm such that the pilot carrier having a low reliability and a predetermined value smaller than a threshold value with respect to the signal reception strength of the pilot carrier is not used for the frequency correction and phase correction, that is, it is not important to use the pilot carrier having a small signal reception strength in this case for the demodulation.

According to the nineteenth embodiment, the internal construction of the radio reception apparatus is same as that of the apparatus of FIG. 21, so that the explanation is omitted.

Figure 25:
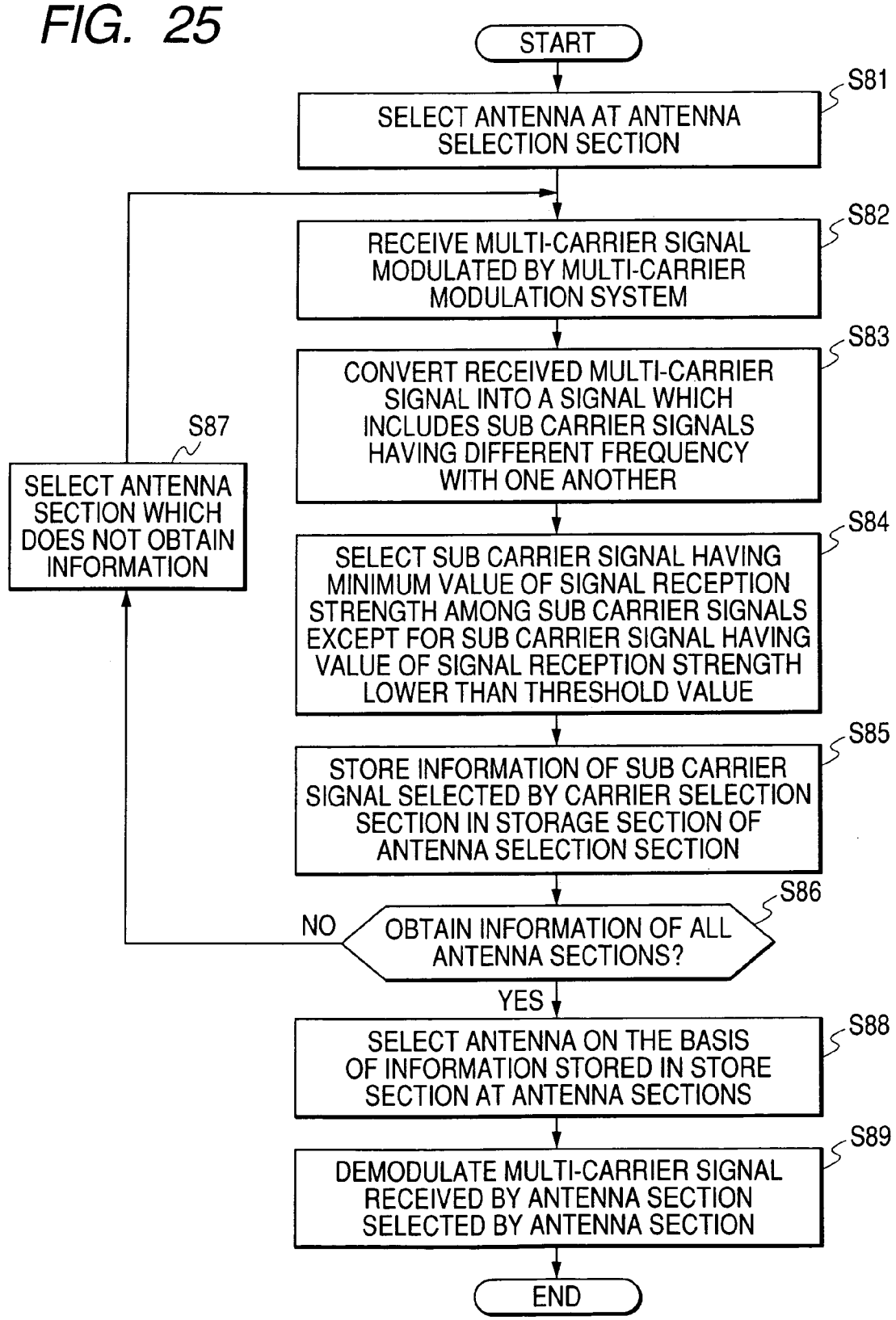
FIG. 25 is a flowchart to show an example of the processing operation according to nineteenth embodiment.

FIG. 25 is a flowchart to show an example of the processing operation according to nineteenth embodiment. The processing is as same as that of FIG. 19 from Step S81 to step S83. Next, The sub carrier signal having a minimum value of the signal reception strength is selected among the sub carrier signals except for sub carrier signal having a value of the signal reception strength lower than the threshold value. (Step S84) Then, the processing from step S85 to step S87 are performed as same as that from step S75 to step S77 as shown in FIG. 19.

Next, the antenna selection section 40 an antenna section which has a maximum signal reception strength among the sub carrier signals stored in the storage section 45. (Step S88)

Thus, in the nineteenth embodiment, the sub carrier signals are narrow by previously setting the threshold value, so that the processing of the carrier selection section 31 is accelerated by previously getting out of the unnecessary sub carrier signals.

(Twentieth Embodiment)

The twentieth embodiment is a modification of the embodiment of FIG. 19. whether or not the antenna section is selected is determined by a number of the sub carrier signals having a value over the threshold value.

Figure 26:
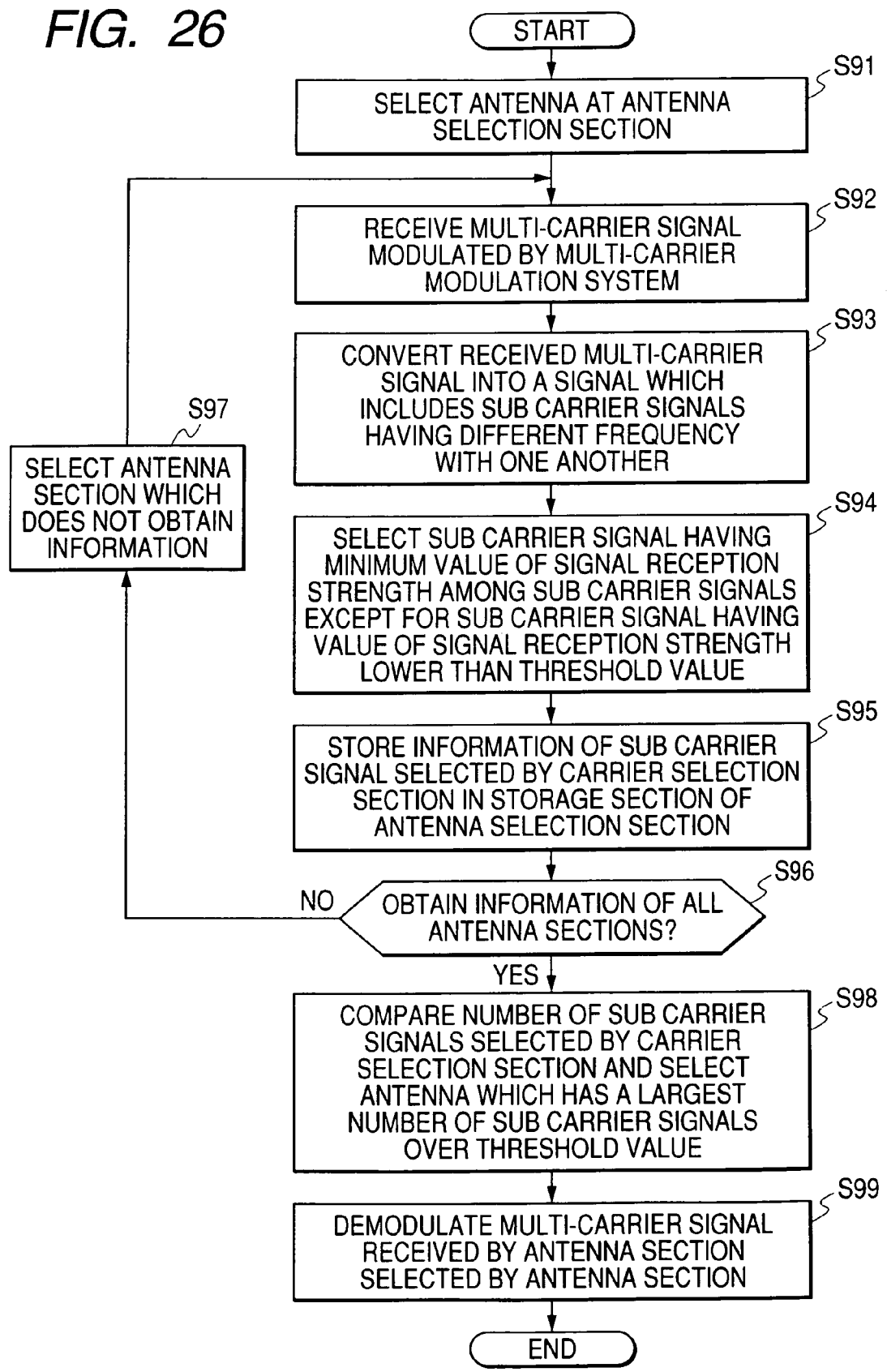
FIG. 26 is flow chart to show an example of the processing operation according to the twentieth embodiment.

FIG. 26 is flowchart to show an example of the processing operation according to the twentieth embodiment. The processing from step S91 to step S97 is perform as same as that from step S81 to step S87 as shown in FIG. 25. Next, the antenna selection section 40 compares a number of the sub carrier signals selected by the carrier selection section 31 and selects an antenna which has a largest number of the sub carrier signals over the threshold value. (Step S98)

In the processing of Step S98, in case that plural antenna sections are applicable, the sub carrier signal which has a maximum signal strength value is selected by comparing a signal strength of the sub carrier signal having a minimum value among the plural antenna sections with one another.

Further, in Step S98, the antenna section which has maximum average signal strength of the sub carrier signal selected by the carrier selection section 31 may be selected.

Thus, according to twentieth embodiment, in case that the algorism such that the pilot carrier having a low reliability and a predetermined value smaller than a threshold value with respect to the signal reception strength of the pilot carrier is not used for the frequency correction and phase correction is used, more pilot carrier signals can be used for the frequency correction and the phase correction. In addition, in case that plural antenna sections having a maximum number of selected sub carrier signals, among the plural antenna sections, more reliable antenna section can be selected on the basis of the signal strength of the sub carrier signals selected by the carrier selection section 31. Thus, the communication quality is improved.

(Twenty-first Embodiment)

According to the twenty-first embodiment, sub carrier signals included in multi-carrier signals are weighted in accordance with frequency differences between frequencies of the pilot carrier signals and frequencies of the sub carrier signals.

Figure 27:
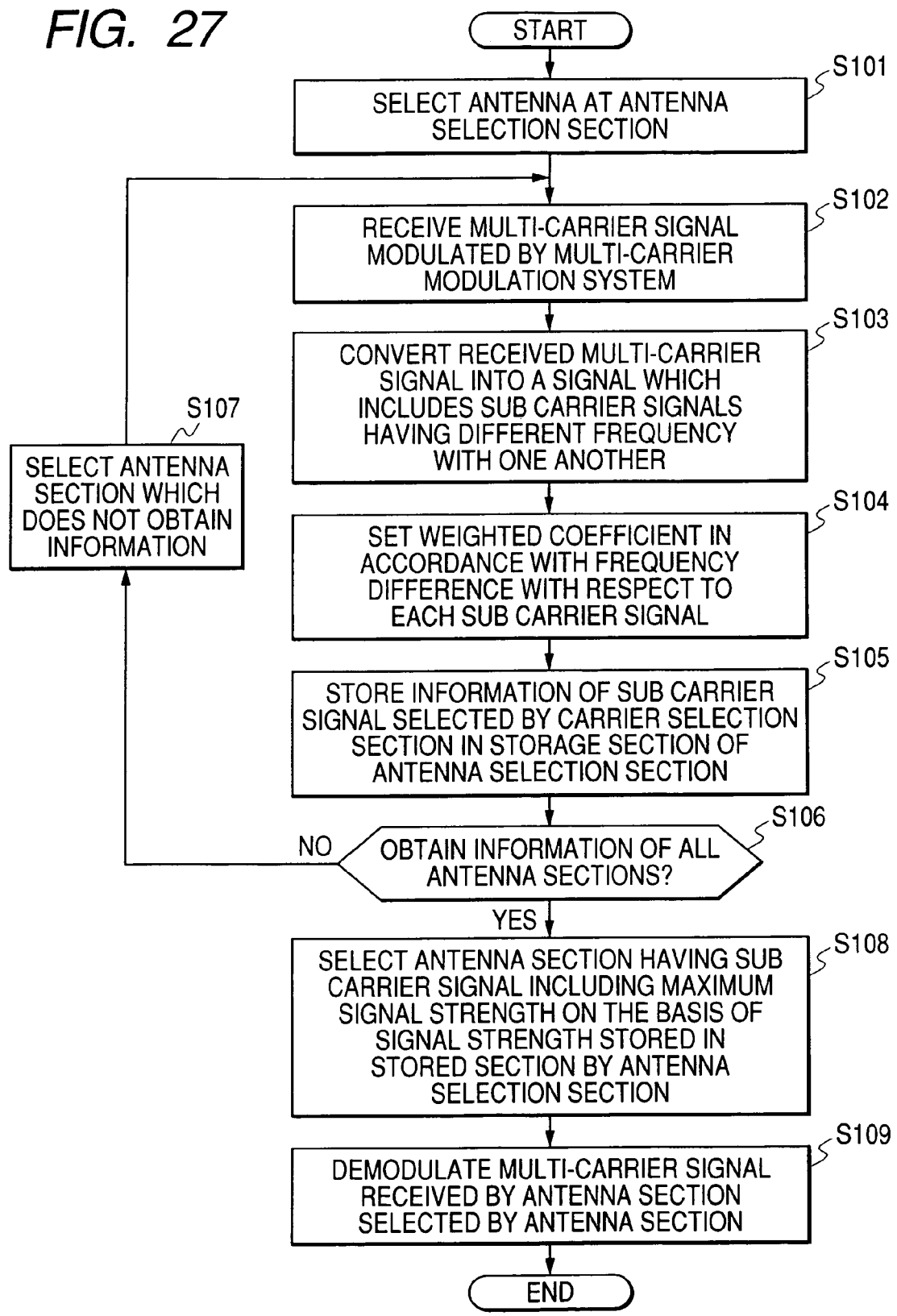
FIG. 27 is a flow chart of the processing operation according the radio reception apparatus according to the twenty-first embodiment.

FIG. 27 is a flow chart of the processing operation according the radio reception apparatus according to the twenty-first embodiment. The processing from step S101 to step S103 is as same as that of FIG. 19. Next, with respect to each sub carrier signal, a weighted coefficient is set in accordance with the frequency difference. (Step S104) a relation between the frequencies and the weighted coefficient may be previously prepared. The smaller frequency differences between the pilot carrier signal and sub carrier signal are, the larger weighted coefficient is set.

Next, the weighted signal reception strength is calculated by multiplying the signal reception strength with the set weighted coefficient. (Step S105) Next, the processing from step S106 to step S108 is as same as that from step 575 to step S77 as shown in FIG. 19.

Next, the antenna selection section 40 selects an antenna section which has a sub carrier signal having a maximum signal reception strength on the basis of the calculation result of the signal reception strength by the step S105. (Step S109)

Thus, according to the twenty-first embodiment, since the sub carrier signal is weighted in accordance with the frequency differences between the pilot carrier signal and the sub carrier signal, the sub carrier signal near the frequency of the pilot carrier signal can be preferentially selected.

(Twenty-second Embodiment)

According to the twenty-second embodiment, the processing is performed in each group which holds plural sub carrier signals together as one group.

Figure 28:
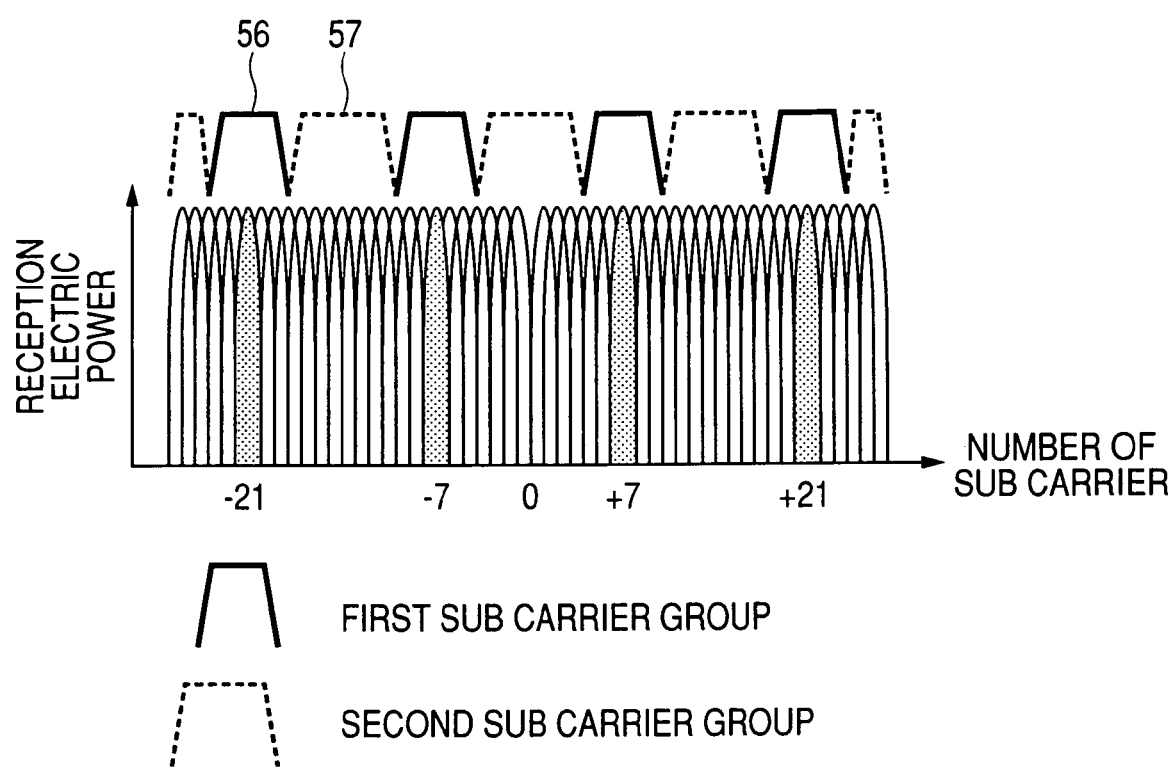
FIG. 28 is an view to explain the general description according the twenty-second embodiment.

FIG. 28 is an view to explain the general description according the twenty-second embodiment. In the twenty-second embodiment, all sub carrier signals is divided into first sub carrier group 55 in which the sub carrier signals are near the frequency of the pilot carrier signal and second sub carrier group 56 in which the sub carrier signals is far from the frequency of the pilot carrier signal.

Each carrier selection section 31 selects at least one sub carrier signal from the first sub carrier group 55, and selects at least one sub carrier signal from the second sub carrier group 56. The antenna selection section 40 selects an antenna section on the basis of the signal reception strength of the sub carrier signals which selected from both sub carrier groups 55, 56.

For example, the carrier selection section 31 respectively selects a subcarrier signal having a minimum signal reception strength from the sub carrier signal groups. Thus, the two selected sub carrier signals is differently weighted, and calculates the weighted signal reception strength.

The antenna selection section 40 selects an antenna which is corresponding to the sub carrier signal having the weighted maximum signal reception strength.

Alternatively, the carrier selection section 31 selects a sub carrier signal having a minimum signal reception strength from the first sub carrier group 55, and selects all sub carrier signals of the second sub carrier group 56. the signal reception strength of the sub carrier signal selected by the first sub carrier group 55 and the average signal reception strength of all sub carrier signals of the sub carrier group 56 are respectively weighted, and thus are combined. In this case, the antenna selection section 40 selects an antenna section which has a sub carrier signal having a maximum signal reception strength calculated by the carrier selection section 31.

Thus, according to the twenty-second embodiment, the sub carrier signals are divided into plural groups. The signal reception strength are weighted and corrected in each group, so that the antenna section can be selected in a short time compared with the case that a weighted operation is performed in each sub carrier signal.

What is claimed is:

1. A radio reception apparatus comprising:
   a plurality of antenna sections, each of the antenna sections receiving a multicarrier signal which is modulated according to multicarrier modulation;
   a plurality of carrier selection sections, each of the carrier selection sections selecting at least one subcarrier signal for each of the plurality of antenna sections out of the multicarrier signal received by each of the plurality of antenna sections;
   an antenna selection section which selects a reception antenna section from among the plurality of antenna sections based on signal strengths of the subcarrier signals selected by the plurality of carrier selection sections;
   a demodulation section which demodulates the multicarrier signal received by the antenna section selected by the antenna selection section; and
   a reception strength measurement section which measures the reception strength of the multicarrier signal, wherein
   each of the plurality of carrier selection sections selects at least one pilot carrier signal out of the multicarrier signal,
   the antenna selection section selects the reception antenna section from among the plurality of antenna sections based on the signal strengths of the pilot carrier signals selected by the plurality of carrier selection sections, and
   the antenna selection section selects the reception antenna section from among the plurality of antenna sections based on the signal strengths of the pilot carrier signals selected by the plurality of carrier selection sections and the reception strength of the multicarrier signal.

2. A radio reception apparatus comprising:
   a plurality of antenna sections, each of the antenna sections receiving a multicarrier signal which is modulated according to multicarrier modulation;

a plurality of carrier selection sections, each of the carrier selection sections selecting at least one subcarrier signal for each of the plurality of antenna sections out of the multicarrier signal received by each of the plurality of antenna sections;

an antenna selection section which selects a reception antenna section from among the plurality of antenna sections based on signal strengths of the subcarrier signals selected by the plurality of carrier selection sections; and a demodulation section which demodulates the multicarrier signal received by the antenna section selected by the antenna selection section, wherein each of the plurality of carrier selection sections selects subcarrier signals contained in a frequency band in the range incremented or decremented by a predetermined frequency from the center frequency of the multicarrier signal, and the antenna selection section calculates average signal strength of the subcarrier signals contained in the frequency band and selects the reception antenna section from among the plurality of antenna sections based on the average signal strength.

3. A radio reception apparatus comprising:

a plurality of antenna sections, each of the antenna sections receiving a multicarrier signal which is modulated according to multicarrier modulation;

a plurality of carrier selection sections, each of the carrier selection sections selecting at least one subcarrier signal for each of the plurality of antenna sections out of the multicarrier signal received by each of the plurality of antenna sections;

an antenna selection section which selects a reception antenna section from among the plurality of antenna sections based on signal strengths of the subcarrier signals selected by the plurality of carrier selection sections; and a demodulation section which demodulates the multicarrier signal received by the antenna section selected by the antenna selection section, wherein each of the plurality of carrier selection sections selects subcarrier signals contained in a frequency band between a pilot carrier signal including the maximum frequency and a pilot carrier signal including the minimum frequency among pilot carrier signals in the multicarrier signal, and the antenna selection section calculates average signal strength of the subcarrier signals contained in the frequency band and selects the reception antenna section from among the plurality of antenna sections based on the average signal strength.

4. A radio reception apparatus comprising:

a plurality of antenna sections, each of the antenna sections receiving a multicarrier signal which is modulated according to multicarrier modulation;

a plurality of carrier selection sections, each of the carrier selection sections selecting at least one subcarrier signal for each of the plurality of antenna sections out of the multicamer signal received by each of the plurality of antenna sections;

an antenna selection section which selects a reception antenna section from among the plurality of antenna sections based on signal strengths of the subcarrier signals selected by the plurality of carrier selection sections; and a demodulation section which demodulates the multicarrier signal received by the antenna section selected by the antenna selection section, wherein the demodulation section comprises:
a signal strength measurement section which measures the signal strengths of a plurality of pilot carrier signals in the multicarrier signal received by the antenna section selected by the antenna selection section;
a distortion amount calculation section which measures the distortion amounts of the pilot carrier signals;
a calculation section which assigns a weight to the distortion amount of each of the pilot carrier signals using the signal strengths of the pilot carrier signals, thereby calculating a distortion correction value; and
a distortion correction section which corrects the multicarrier signal received by the antenna section selected by the antenna selection section based on the distortion correction value.

5. A radio reception apparatus comprising:

a plurality of antenna sections, each of the antenna sections receiving a multicarrier signal which is modulated according to multicarrier modulation;

a plurality of carrier selection sections, each of the carrier selection sections selecting at least one subcarrier signal for each of the plurality of antenna sections out of the multicarrier signal received by each of the plurality of antenna sections;

an antenna selection section which selects a reception antenna section from among the plurality of antenna sections based on signal strengths of the subcarrier signals selected by the plurality of carrier selection sections; and a demodulation section which demodulates the multicarrier signal received by the antenna section selected by the antenna selection section, wherein the demodulation section comprises:
a signal strength measurement section which measures the signal strengths of a plurality of pilot carrier signals in the multicarrier signal received by the antenna section selected by the antenna selection section;
a distortion amount calculation section which measures the distortion amounts of the pilot carrier signals;
a calculation section which represents the distortion amount and the signal strength of each of the pilot carrier signals by a vector and combining the vectors corresponding to the pilot carrier signals to calculate a distortion correction value; and
a distortion correction section which corrects the multicarrier signal received by the antenna section selected by the antenna selection section based on the distortion correction value.

6. A radio reception method comprising:

receiving a multicarrier signal modulated according to multicarrier modulation through a plurality of antenna sections;

selecting at least one subcarrier signal for each of the antenna sections out of the multicarrier signal received by each of the antenna sections based on frequency;

selecting a reception antenna section from among the antenna sections based on the signal strengths of the selected subcarrier; and demodulating the multicarrier signal received by the selected reception antenna section, wherein when the multicarrier signal is received by the selected reception antenna section, the signal strengths of pilot carrier signals are measured in the multicarrier signal received by the selected antenna section, the distortion amount of the pilot carrier signal is measured, a distortion correction value based on the signal strengths and the distortion amounts of the pilot carrier signals is calculated, and the multicarrier signal received by the antenna section selected is corrected based on the distortion correction value.

7. A radio reception apparatus comprising:
plural antenna sections which receive a multi carrier signal modulatable by multi carrier modulation;
plural carrier selection sections corresponding to each of the plural antenna sections and selecting at least one sub carrier signal having a frequency near to a frequency of a pilot carrier signal in the multi carrier signal received in a corresponding antenna section;
an antenna selection section selecting an antenna for receiving from the plural antenna sections on the basis of the signal strength of the sub carrier signal selected by the plural carrier selection sections; and
a demodulation section demodulating the multi carrier signal which the antenna section selected by the antenna selection section receives.

8. A radio reception apparatus according to claim 7, wherein
each of the plural carrier selection sections selects a sub carrier signal having a minimum signal level from a plurality of the sub carrier signals near to the frequency of the pilot carrier signal,
the antenna selection section selects an antenna section having a maximum signal level from the sub carrier signal selected by each of the plural carrier selection sections.

9. A radio reception apparatus according to claim 7, wherein
the carrier selection section weights a signal strength of the sub carrier signal in accordance with frequency difference with a frequency of the pilot carrier signal, and
the antenna selection section selects an antenna for receiving on the basis of the weighted signal strength of the sub carrier signal.

10. A radio reception apparatus comprising:
plural antenna sections which receive a multi carrier signal modulatable by multi carrier modulation;
a carrier selection section selecting at least one sub carrier signal having a frequency near to a frequency of a pilot carrier signal in the multi carrier signal selected in the multi carrier signal received by the plural antenna sections;
an antenna selection section selecting an antenna for receiving from the plural antenna sections on the basis of the signal strength of the sub carrier signal selected by the carrier selection section; and
a demodulation section demodulating the multi carrier signal which the antenna section selected by the antenna selection section receives.

11. A radio reception apparatus comprising:
plural antenna sections which receive a multi carrier signal modulatable by multi carrier modulation;
a carrier selection section selecting at least one sub carrier signal having a frequency near to a frequency of the pilot carrier signal in the multi carrier signal selected in the multi carrier signal received by the plural antenna sections;
an antenna selection section selecting an antenna for receiving from the plural antenna sections on the basis of the signal strength of the sub carrier signal selected by the carrier selection section; and
a demodulation section demodulating the multi carrier signal which the antenna section selected by the antenna selection section receives, wherein
the antenna selection section further includes:
a signal store section storing the sub carrier signal selected by the carrier selection section; and
a signal comparison section selects an antenna section having a sub carrier signal which has a maximum signal strength from the sub carrier signal stored in the signal store section.

12. A radio reception apparatus comprising:
plural antenna sections which receive a multi carrier signal modulatable by multi carrier modulation;
a carrier selection section selecting at least one sub carrier signal having a frequency near to a frequency of the pilot carrier signal in the multi carrier signal selected in the multi carrier signal received by the plural antenna sections;
an antenna selection section selecting an antenna for receiving from the plural antenna sections on the basis of the signal strength of the sub carrier signal selected by the carrier selection section; and
a demodulation section demodulating the multi carrier signal which the antenna section selected by the antenna selection section receives, wherein
the carrier selection section further includes:
a mutual relation calculation section calculating a mutual relation with a frequency near to a frequency of a pilot carrier signal with respect to each of the sub carrier signal included in the multi carrier signal selected by the antenna selection section; and
a reception strength comparison section comparing reception strength of the sub carrier signal on the basis of the calculation result of the mutual relation calculation section.

13. A radio reception apparatus comprising:
plural antenna sections which receive a multi carrier signal modulatable by multi carrier modulation;
a carrier selection section selecting at least one sub carrier signal having a frequency near to a frequency of the pilot carrier signal in the multi carrier signal selected in the multi carrier signal received by the plural antenna sections;
an antenna selection section selecting an antenna for receiving from the plural antenna sections on the basis of the signal strength of the sub carrier signal selected by the carrier selection section; and
a demodulation section demodulating the multi carrier signal which the antenna section selected by the antenna selection section receives, wherein
the carrier selection section selects sub carrier signal from a sub carrier signal except for a signal having no fewer than a predetermined value of the signal strength in the sub carrier signal included in the multi carrier signal.

14. A radio reception apparatus according to claim 13, wherein
the antenna selection section selects an antenna for receiving having a maximum number of the sub carrier signal over a threshold value with respect to a signal strength.

15. A radio reception apparatus comprising:
plural antenna sections which receive a multi carrier signal modulatable by multi carrier modulation;
a carrier selection section selecting at least one sub carrier signal having a frequency near to a frequency of the pilot carrier signal in the multi carrier signal selected in the multi carrier signal received by the plural antenna sections;

an antenna selection section selecting an antenna for receiving from the plural antenna sections on the basis of the signal strength of the sub carrier signal selected by the carrier selection section; and a demodulation section demodulating the multi carrier signal which the antenna section selected by the antenna selection section receives, wherein the carrier selection section further includes:

a sub carrier dividing section divided into a first sub carrier group having a sub carrier signal positioned in a predetermined frequency band from a frequency of a pilot carrier signal and a second sub carrier group having a sub carrier signal out of the predetermined frequency band; and a group selection section selecting at least one sub carrier signal of the first sub carrier group and at least one sub carrier signal of the second sub carrier group, and the antenna selection section selects an antenna for receiving on the basis of the signal strength of the sub carrier signals selected by the group selection section.

* * * * *